(12) United States Patent
Imai

(10) Patent No.: US 10,194,003 B2
(45) Date of Patent: Jan. 29, 2019

(54) INFORMATION PROCESSING APPARATUS, SERVER-CLIENT SYSTEM, CONTROL METHOD OF INFORMATION PROCESSING APPARATUS, AND STORAGE MEDIUM

(71) Applicant: CANON KABUSHIKI KAISHA, Tokyo (JP)

(72) Inventor: Yasuhiro Imai, Noda (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 255 days.

(21) Appl. No.: 15/074,292

(22) Filed: Mar. 18, 2016

(65) Prior Publication Data

US 2016/0285696 A1    Sep. 29, 2016

(30) Foreign Application Priority Data

Mar. 27, 2015 (JP) .................................. 2015-066040

(51) Int. Cl.
*G06F 15/173* (2006.01)
*G06F 15/16* (2006.01)
(Continued)

(52) U.S. Cl.
CPC ................. *H04L 67/42* (2013.01); *G06F 3/00* (2013.01); *H04L 41/0816* (2013.01)

(58) Field of Classification Search
CPC ........ H04L 67/42; H04L 41/0816; G06F 3/00
(Continued)

(56) References Cited

U.S. PATENT DOCUMENTS 7,979,583 B2    7/2011  Okano .......................... 709/245
8,706,857 B2 *  4/2014  Esaka ............... G06F 17/30581
                                                              709/223
(Continued)

FOREIGN PATENT DOCUMENTS

JP          11-119938 A       4/1999
JP          2008/287674      11/2008
(Continued)

*Primary Examiner* — Bharat Barot
(74) *Attorney, Agent, or Firm* — Venable LLP

(57) ABSTRACT

In the case where a user changes a setting value, such as an IP address, in a client device equipped with a server function, the setting value as a server is changed, and as a result of this, it is no longer possible to implement synchronization processing with the client. An information processing apparatus including a storage unit configured to store a server application for managing setting information of one or more clients and store a client application, the server application managing server address information representing a connection destination address which is used by the one or more clients to access the server application and the client application managing client address information representing an address of the information processing apparatus as a client which is one of the one or more clients, and both the server address information and the client address information indicating an address of the information processing apparatus; and, one or more processing units configured to execute the server application and the client application and change, in a case where the client address information has been changed or is to be changed, the server address information so that the server address information indicates the same address as the client address information which has been changed or is to be changed.

5 Claims, 18 Drawing Sheets

(51) Int. Cl.
*H04L 29/06* (2006.01)
*H04L 12/24* (2006.01)
*G06F 3/00* (2006.01)

(58) Field of Classification Search
USPC .................. 709/202–203, 223–224, 248
See application file for complete search history.

(56) References Cited

U.S. PATENT DOCUMENTS

| | | | |
|---|---|---|---|
| 9,069,724 B2 | 6/2015 | Fukasawa | ............. G06F 15/177 |
| 9,128,646 B2* | 9/2015 | Motokado | ............. G06F 3/1205 |
| 2004/0221207 A1* | 11/2004 | Yokota | ................ G06F 11/2023 |
| | | | 714/48 |
| 2008/0294718 A1* | 11/2008 | Okano | .................... H04L 67/16 |
| | | | 709/203 |
| 2010/0070972 A1* | 3/2010 | Kumagai | ................ H04L 67/02 |
| | | | 709/223 |
| 2011/0134452 A1 | 6/2011 | Kim et al. | ................... 358/1.13 |
| 2012/0072589 A1* | 3/2012 | Oda | .................... H04L 67/1002 |
| | | | 709/224 |
| 2016/0105315 A1* | 4/2016 | Okayama | ........... H04L 41/0883 |
| | | | 713/2 |
| 2016/0277241 A1* | 9/2016 | Nakamori | ........... H04L 41/0813 |
| 2016/0277621 A1* | 9/2016 | Iida | ......................... H04L 67/10 |

FOREIGN PATENT DOCUMENTS

| | | |
|---|---|---|
| JP | 2009/070293 | 4/2009 |
| JP | 2010/218566 | 9/2010 |
| JP | 2011/060001 | 3/2011 |
| JP | 2013/122689 | 6/2013 |

\* cited by examiner

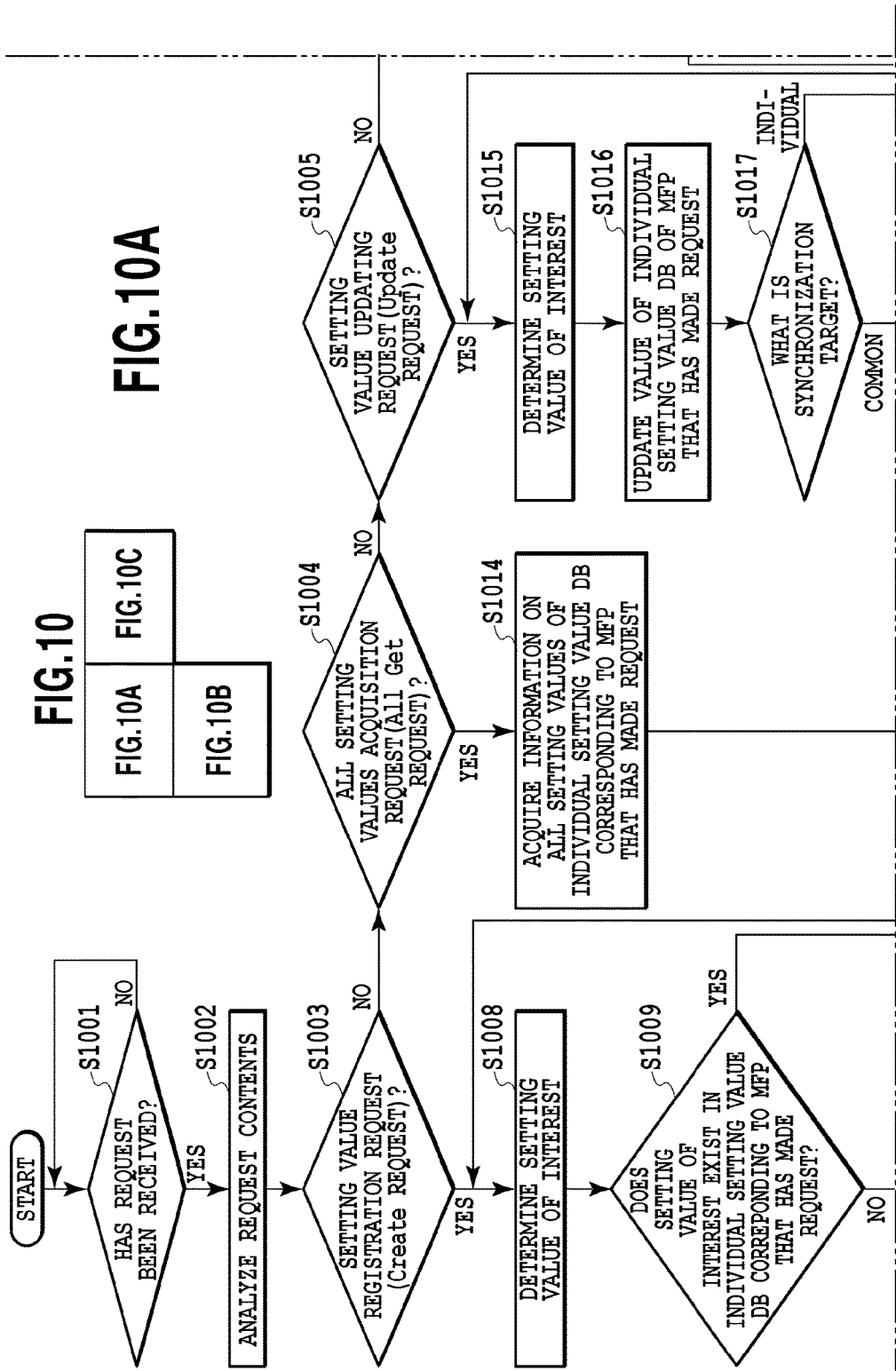

INFORMATION PROCESSING APPARATUS, SERVER-CLIENT SYSTEM, CONTROL METHOD OF INFORMATION PROCESSING APPARATUS, AND STORAGE MEDIUM

BACKGROUND OF THE INVENTION

Field of the Invention

The present invention relates to a synchronization technique of setting values that are saved in each information processing apparatus in an environment in which a plurality of information processing apparatuses is connected to one another via a network. In particular, the present invention relates to a synchronization technique in the case where an information processing apparatus capable of operating as a client is equipped with the function of a server.

Description of the Related Art

In recent years, there is a case where master data of setting values (setting information) of an information processing apparatus (client), such as a multi function peripheral (MFP), is managed unitedly by saving the master data in a server that is connected via a network. The setting value is synchronized between a client and a server and in the case where the value of the master data on the server is changed, the client is notified of the value after the change and the setting value within the client is also changed. Similarly, in the case where the setting value within the client is changed, the value of the master data on the server is also changed. Here, there exists a setting value (common setting value) that is synchronized in common with one anther among a plurality of clients. In this situation, in the case where the common setting value is changed in a certain client, the master data on the server and the setting value within all the clients that are the targets of synchronization are changed as a result. On the other hand, there exists a setting value (individual setting value) that is not synchronized with another client and in this situation, in the case where the individual setting value is changed in a certain client, only the setting value of the relevant client of the master data on the server is changed and the change is not reflected in the setting value of the other clients.

In the case where a user starts synchronization under the management of the server for various setting values of the client, processing to establish an initial connection (initial connection processing) between the server and the client is necessary. At the time of the initial connection processing, the client makes a request to the server for registration of all the setting values of the client. At this time, in the case where the "setting values of the client" relating to the registration request are already registered on the master data of the server, the server ignores the processing to register the "setting values of the client".

Conventionally, already-determined server processing is performed on a client based on a specific setting value that is registered in a server. For example, Japanese Patent Laid-Open No. H11-119938 (1999) has disclosed a technique to specify a printing object to be printed based on a printing request from a client and to determine an action based on an attribute that is set in correspondence to the specified printing object. In this technique, the server determines an action in accordance with the attribute that is set for each object by having an attribute-dependent action definition table with which an action that should be performed in accordance with the attribute is associated and by referring to the table.

In the client-server system as described above, there is a case where a client device, such as an MFP, whose setting value can be easily changed by a common user, is caused to have the function of the server. In such a case where a specific client has both the function as the server and the function as the client, the "server" and the "client equipped with the function as the server" share the same value for a certain setting value as a result. Then, as to the setting value (shared setting value) that is shared with and referred to by the server and the client such as this, the change in the setting value in the client leads to the change in the setting value of the server. The shared setting value includes, for example, an IP address and a host name. Then, in the client equipped with the server function, it is possible for a user to easily change the IP address and the host name, and therefore, it may happen that the user unintentionally changes the setting value that is shared with the server. As a result of this, the setting value as the server is also changed, and therefore, there occurs such a problem that synchronization with all the clients including itself is no longer possible. As to this point, in the technique of Japanese Patent Laid-Open No. H11-119938 (1999), it is not possible to resolve the problem that occurs due to the change in the setting value of the server itself although the server processing depending on the attribute that is set based on the printing request from the client is performed.

SUMMARY OF THE INVENTION

An information processing apparatus according to the present invention is an information processing apparatus comprising a storage unit configured to store a server application for managing setting information of one or more clients and store a client application, the server application managing server address information representing a connection destination address which is used by the one or more clients to access the server application and the client application managing client address information representing address of the information processing apparatus as a client which is one of the one or more clients, and both the server address information and the client address information indicating address of the information processing apparatus; and one or more processing unit configured to execute the server application and the client application and change, in a case where the client address information has been changed or is to be changed, the server address information so that the server address information indicates the same address as the client address information which has been changed or is to be changed.

Further features of the present invention will become apparent from the following description of exemplary embodiments (with reference to the attached drawings).

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

[First Embodiment]

Figure 1:
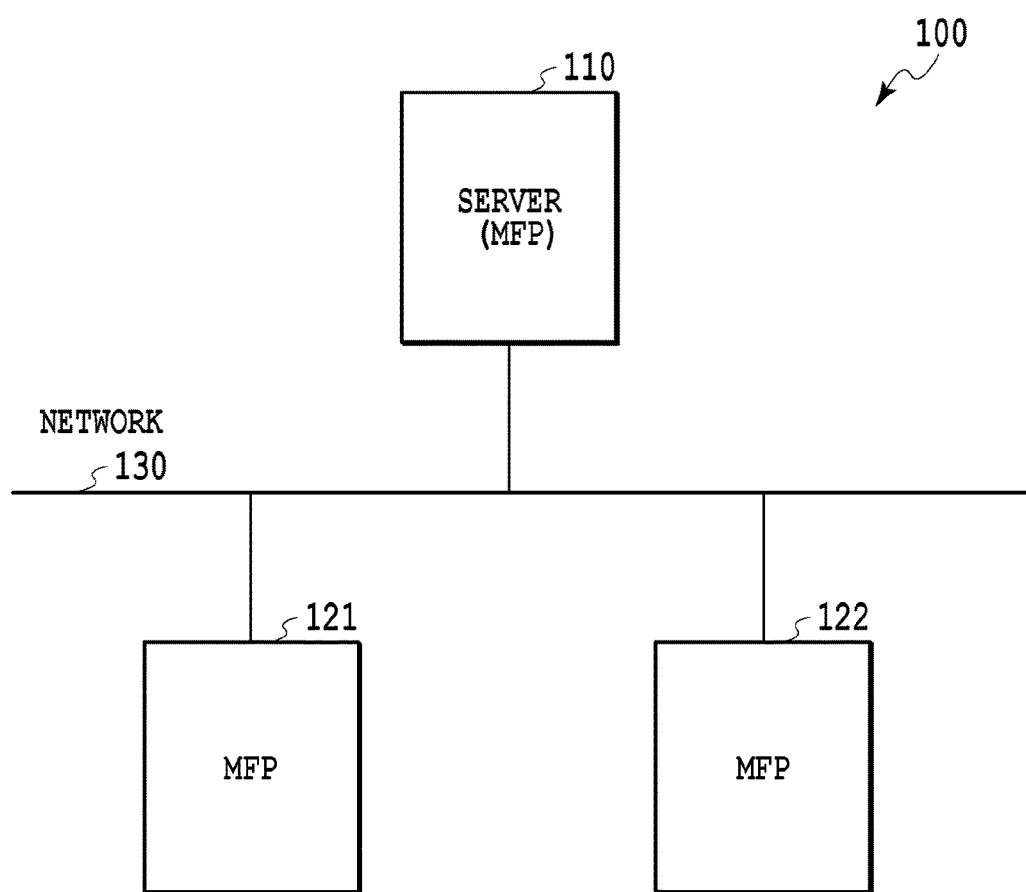
FIG. 1 is an example of a system configuration diagram showing an entire printing system.

FIG. 1 is an example of a system configuration diagram showing an entire printing system. A printing system 100 includes one server 110 and two MFPs 121/122 and these units are connected via a network 130.

The server 110 performs synchronization management of master data of setting values (setting information) of the MFP 121 and the MFP 122. In other words, in the case where the master data is changed in the server 110, the MFP 121 and the MFP 122 are notified of the information on the change via the network 130 as a response to the polling from the MFP 121 and the MFP 122. Further, in the case where the setting value is changed in the MFP 121 and the MFP 122, the server 110 is notified of the information on the change via the network 130 and the server 110 changes the value of the master data of itself upon receipt of the notification of the change. The MFP described as (MFP) with parentheses indicates that there is a case where the MFP, which is also a client device equipped with the server function, also functions as the server 110. The present invention premises the configuration in which one of the client devices on the network in the server-client system also has the function of the server.

The MFPs 121/122 as the client devices are equipment that implements a plurality of kinds of function, for example, the function as a copy machine, the function as a facsimile, etc., and internally store a variety of setting values (setting information) that are made use of at the time of performing those functions. As described above, among the setting values, there exists a setting value (common setting value) that is synchronized among a plurality of MFPs, such as between the MFP 121 and the MFP 122. As to the common setting value, in the case where the master data on the server 110 is changed, both the MFP 121 and the MFP 122 are notified of the information to the effect that the setting value has been changed. In the case where the setting value is changed in one of the MFP 121 and the MFP 122, first, the server 110 is notified of the information on the change, and then, the other MFP is notified of the information on the change from the server 110.

Figure 2:
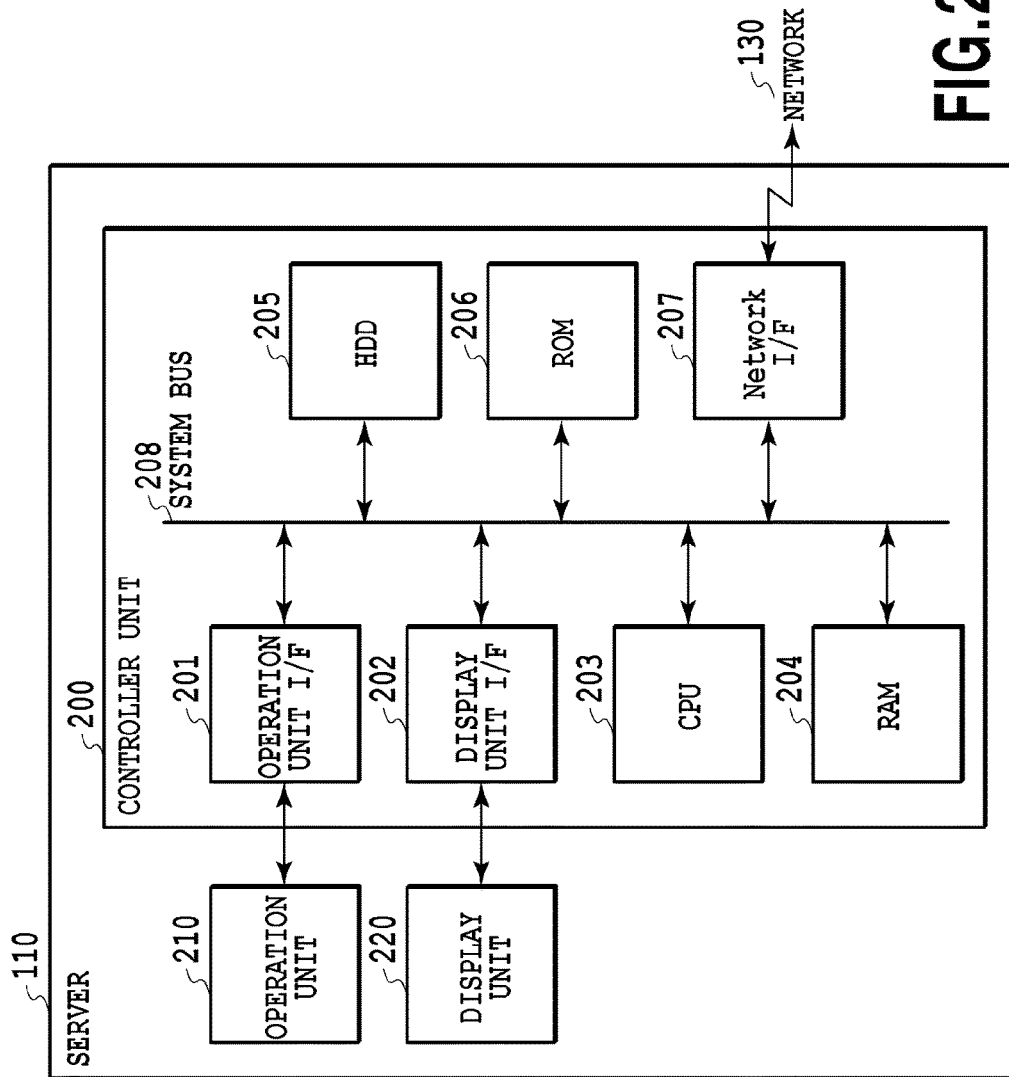
FIG. 2 is a block diagram showing an internal configuration of a server.

FIG. 2 is a block diagram showing an internal configuration of the server 110. The server 110 includes a controller unit 200, an operation unit 210 for a user to perform an input operation, and a display unit 220 consisting of a monitor or the like for displaying various kinds of information. Then, the controller unit 200 has an operation unit I/F 201, a display unit I/F 202, a CPU 203, a RAM 204, an HDD 205, a ROM 206, and a network I/F 207 and those units are connected to one another via a system bus 208.

The CPU 203 activates an OS by using a boot program that is stored in the ROM 206. The CPU 203 executes application programs stored in the HDD 205 on the OS, and thereby, performing various kinds of processing. As the work area of the CPU 203, the RAM 204 is used. The HDD 205 stores the above-described application programs, the master data of the setting values of the MFPs 121/122, etc. Details of a management method of the master data will be described later.

The server 110 performs transmission and reception of data, such as various setting values, with each MFP (client device) via the network 130.

Figure 3:
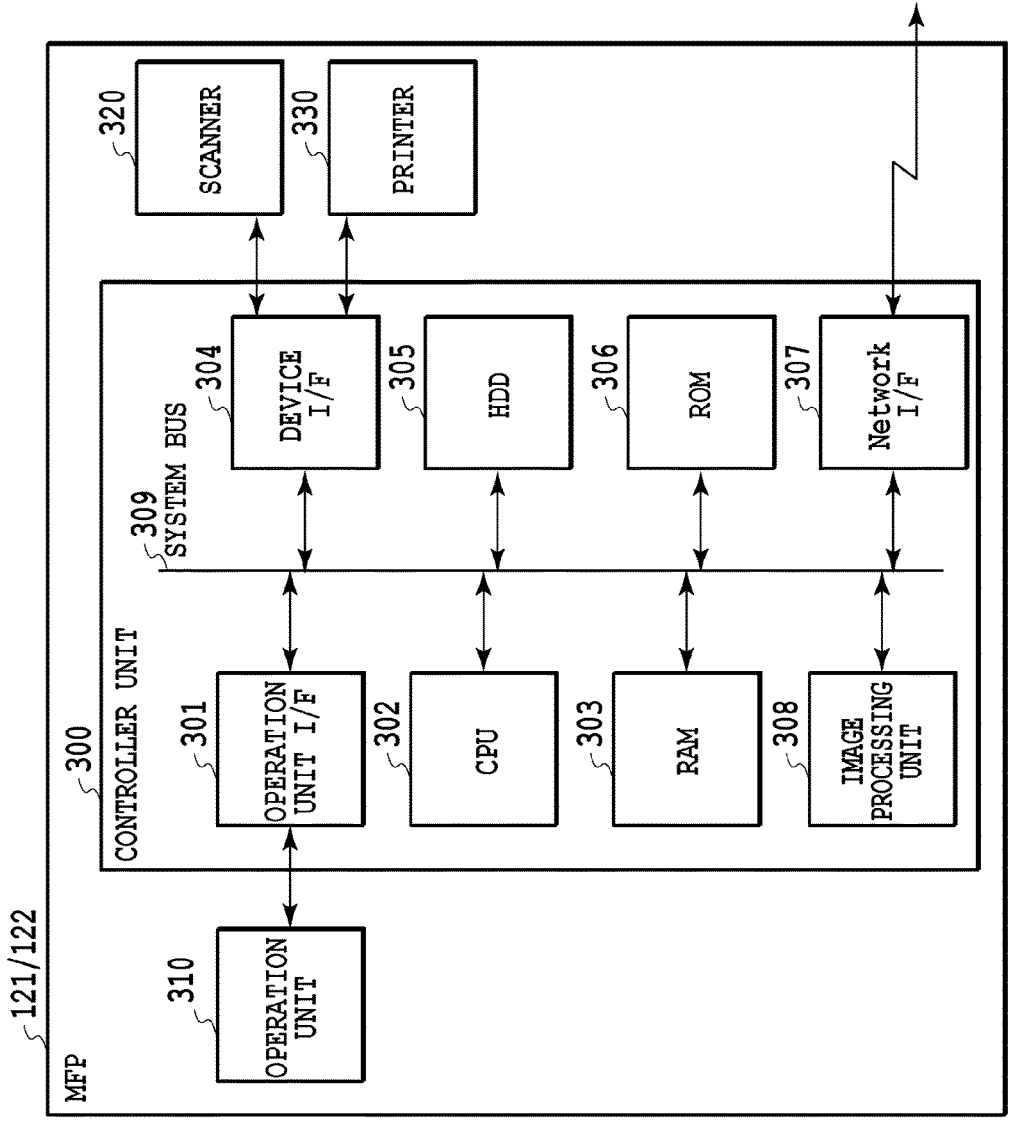
FIG. 3 is a block diagram showing an internal configuration of an MFP.

FIG. 3 is a block diagram showing an internal configuration of the MFPs 121/122. The MFPs 121/122 include a controller unit 300, an operation unit 310, a scanner 320, and a printer 330. To the controller unit 300, the scanner 320, which is an image input device, and the printer 330, which is an image output device, are connected, in addition to the operation unit 310.

The controller unit 300 has an operation unit I/F 301, a CPU 302, a RAM 303, a device I/F 304, an HDD 305, a ROM 306, a network I/F 307, and an image processing unit 308, and those units are connected to one another via a system bus 309.

The CPU 302 activates an OS by using a boot program that is stored in the ROM 306. The CPU 302 executes application programs stored in the HDD 305 on the OS, and thereby, performing various kinds of processing. As the work area of the CPU 302, the RAM 303 is used. Further, the RAM 303 provides an image memory area for temporarily storing image data as well as providing the work area. The HDD 305 stores the above-described application programs, image data, and various setting values. A management method of the setting value in the MFPs 121/122 will be described later.

The operation unit I/F 301 is an interface with the operation unit 310 having a touch panel, and outputs image data that is displayed on the operation unit 310 to the operation unit 310. Further, the operation unit I/F 301 sends out information that is input by a user through the operation unit 310 to the CPU 302. To the device I/F 304, the scanner 320 and the printer 330 are connected and the device I/F 304 performs conversion of the synchronous system/asynchronous system of image data. The MFPs 121/122 perform transmission and reception of various kinds of data with the server 110 and the other MFPs via the network I/F 307 and the network 130.

The image processing unit 308 performs image processing, such as image rotation, image compression, resolution conversion, color space conversion, and tone level conversion, on the image data that is input from the scanner 320 and the image data that is output to the printer 330.

management DB 412, an individual setting value DB 413, a client configuration information management DB 414, a user information DB 415, and a user setting value DB 416.

<Setting Value Meta Information DB>

First, the setting value meta information DB 410 is explained. The setting value meta information DB 410 is a database that stores meta data relating to each setting value managed by the server 110. Table A shows a specific example of the setting value meta information DB 410.

TABLE A

| Key identifier | Wording displayed on UI | Initial value | Value range | Adaptive model type/ firmware version | Display condition | Synchronization target |
|---|---|---|---|---|---|---|
| settings.pattern | copy-forgery-inhibited pattern printing | 0 | 0-1 | model type A/ALL model type B/ALL model type C/3.01 or later | copy-forgery-inhibited pattern license | only individually |
| settings.density | printing density | 5 | 0-10 | model type A/ALL model type B/2.01 or later | — | available in common |
| settings.density | printing density | 3 | 0-6 | model type B/1.99 or earlier model type C/ALL | — | available in common |
| settings.device_sirial | serial ID | "" | character string | ALL | — | only individually |
| settings.copy_cur_page | none (page number in copy) | 0 | 0-99999 | ALL | — | only individually |
| settings.sleep_time | sleep time | 0 | 0-14400 | ALL | — | available in common |
| settings.dns_address | DNS server address | "" | character string | ALL | — | available in common |
| settings.ip_address | IP address | "" | character string | ALL | — | only individually |
| settings.server_address | connection destination server address | "" | character string | ALL | — | only individually |
| ... | | | | | | |

In the case where the MFP, which is a client device, is equipped with the function of the server 110, in general, this is implemented by installing a dedicated application (server application) on the target MFP. At this time, in the MFP having the function of the server 110 at the same time, for example, separation or the like of the storage area within the HDD 305 is performed (the area for storing various kinds of data as the server and the area for storing various kinds of data as the client are separated from each other). The hardware configuration of the MFP itself may be the same as the hardware configuration of another MFP not having the function of the server 110 and it is not necessary to separately provide the controller unit or the HDD for implementing the server function. Further, at this time, the setting values, such as the IP address, the host name, and the system time, which are the server setting values of the server 110 correspond to the shared setting values that are shared with and referred to by the server and the client. In other words, these values coincide with the setting values, such as the IP address, the host name, and the system time, which are the client setting values of the MFPs 121/122 as the client, respectively, (the same values are used) as a result. Here, the setting value as the "shared setting value" is the same for both the server and the client, but is managed independently in the server and in the client. In the case of the IP address, the server application manages the IP address as an address setting of the server and the client application manages the IP address as an address setting of the client. As described above, the setting value as the "shared setting value" is managed differently within the apparatus.

Figure 4:
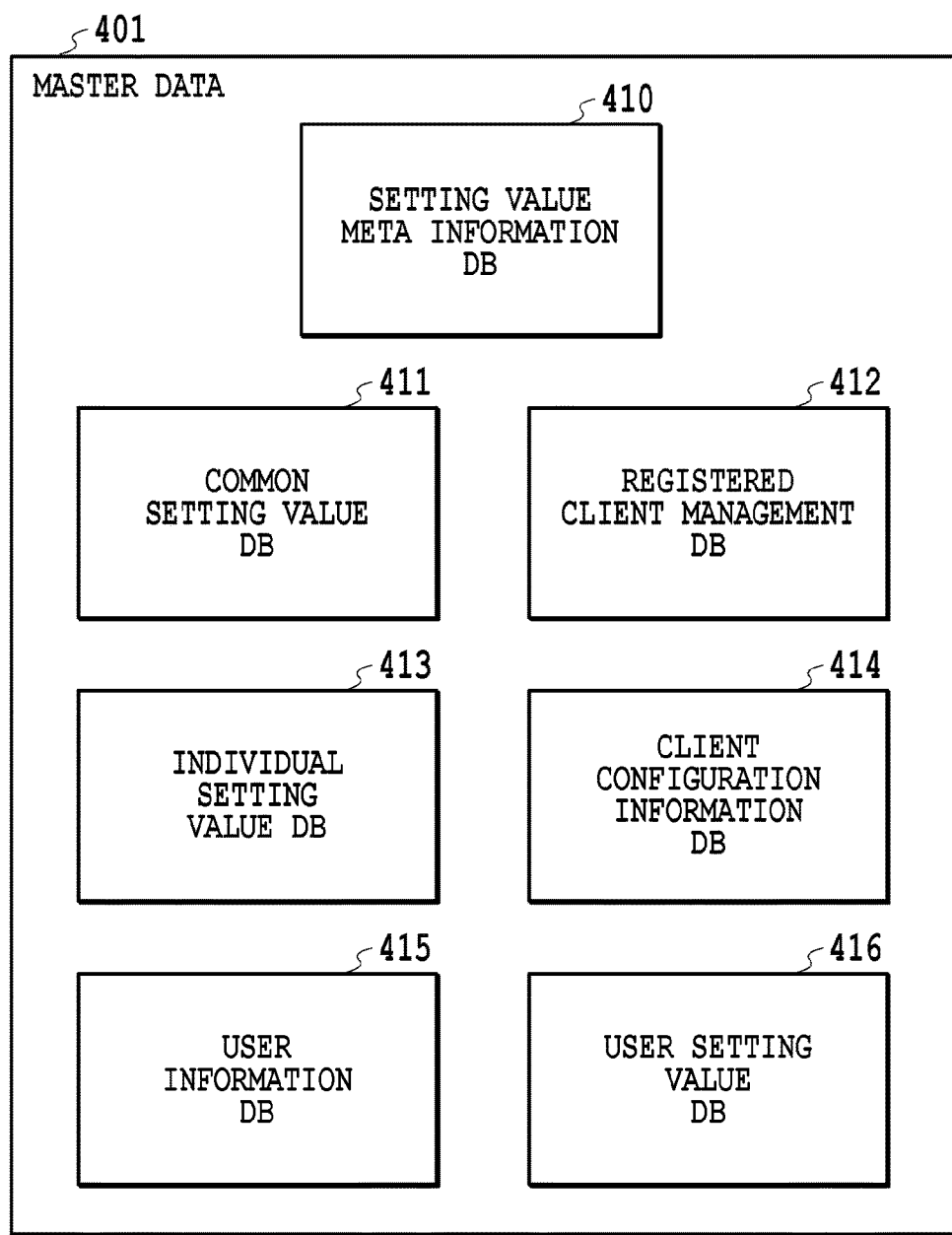
FIG. 4 is a block diagram showing a configuration example of master data that is managed by a server.

FIG. 4 is a block diagram showing a configuration example of master data that is managed by the server 110. Master data 401 includes a setting value meta information DB 410, a common setting value DB 411, a registered client In the example of Table A, information relating to the specifications of each key identifier is included, such as the key identifier for identifying each setting value at the time of performing communication with a client (MFP), the wording at the time of presenting each setting value on the UI screen, the initial value, the value range, the adaptive model type/version, and the setting value display condition. The meta information on each setting value that is managed by the setting value meta information DB 410 may differ in the value range and the initial value of the setting value depending on the model type of the MFP and the version of firmware. Table A indicates that the setting value whose key identifier is represented by "settings.pattern" exists in all the devices for the model type A and the model type B, but exists only in the device whose firmware version is 3.01 or later for the model type C. Further, Table A indicates that the setting value whose key identifier is represented by "settings.density" differs in the value range and the initial value of the setting value depending on the version of firmware that is installed for the model type B (for the version 2.01 and later versions, the value range and the initial value are the same as those of the model type A, and for the version 1.99 and earlier versions, the value range and the initial value are the same as those of the model type C). Each setting value that follows "settings.density" in Table A indicates that the value range and the initial value are the same regardless of the model type or firmware version. Further, in Table A, information on "Synchronization target" each setting value of which indicates the type of the MFP that is the target of synchronization management is included. The information on "Synchronization target" includes two kinds of information, i.e., "available in common" and "only individually", and "available in common" indicates that the setting value is a setting value that can be synchronized in common with one another among a plurality of MFPs, and "only individually" indicates that the setting value is a setting value that can be synchronized with only the MFP of the same device. It is possible to change "available in common" to "only individually", and the contents described in Table A are merely exemplary. In the present embodiment, the information indicating the synchronization target includes the two kinds of information, i.e., "available in common" and "only individually", but, for example, it may also be possible to add "group" indicating that the setting value is a setting value that can be synchronized within a specific device group. Here, "settings.ip_address" and "settings.server_address", which are the important key identifiers in the present embodiment, are explained. Here, "settings.ip_address" indicates the IP address of the MFP and in the case where the MFP is equipped with the function of the server 110 (functions as the server 110 at the same time), the server 110 also refers to this key identifier as the IP address of the server 110 itself. Further, "settings.server_address" indicates the IP address (connection destination server address) of the server 110 that is the destination to which the MFP, which is a client, connects.

The setting value meta information DB 410 is implemented by a method, such as a method of downloading information on the model type and version of all the clients from another server at the time of installation of the server application, or by a client making a request for registration of information on the "model type and version" of the client at the time of start of synchronization with the server 110 (at the time of initial connection processing) by the client.

<Common Setting Value DB>

Next, the common setting value DB 411 is explained. The common setting value DB 411 is a database that stores and manages the setting values common to all the clients (here, MFPs) whose setting values are under the synchronization management by the server 110. Table B is a specific example of the common setting value DB 411 and includes the setting values whose item of "Synchronization target" is "available in common" in Table A described above.

TABLE B

| Key identifier | Value | Date and time of final updating |
|---|---|---|
| settings.density | 0 | 2014/9/9/12:01 |
| settings.sleep_time | 3600 | 2014/9/8/17:35 |
| settings.dns_address | 172.24.147.10 | 2014/9/7/10:00 |

In the example of Table B, information on the key identifier, the value corresponding to the key identifier, and the date and time of final updating is included. The key identifier is an identifier having the same system as that of the key identifier of the setting value meta information DB 410.

<Individual Setting Value DB>

Next, the individual setting value DB 413 is explained. The individual setting value DB 413 is a database that stores and manages the setting values different for a plurality of different clients (here, MFPs) whose setting values are under the synchronization management by the server 110. Table C-1 and Table C-2 are specific examples of the individual setting value DB 413 and include the setting values whose item of "Synchronization target" is "only individually" in Table A described above.

TABLE C-1

| Key identifier | Value | Date and time of final updating |
|---|---|---|
| settings.pattern | 0 | 2014/9/9/12:08 |
| settings.density | 0 | 2014/9/9/12:01 |
| settings.device_sirial | ZZZ8888 | 2014/9/8/17:30 |
| settings.copy_cur_page | 355 | 2014/9/9/15:30 |
| settings.sleep_time | 3600 | 2014/9/8/17:35 |
| settings.dns_address | 172.24.147.10 | 2014/9/7/10:00 |
| settings.ip_address | 172.24.147.51 | 2014/9/8/17:35 |
| settings.server_address | 172.24.147.51 | 2014/9/7/11:00 |
| ... | | |

TABLE C-2

| Key identifier | Value | Date and time of final updating |
|---|---|---|
| settings.pattern | 1 | 2014/9/9/12:05 |
| settings.density | 0 | 2014/9/9/12:01 |
| settings.device_sirial | ZZZ99999 | 2014/9/8/17:35 |
| settings.copy_cur_page | 100 | 2014/9/9/12:01 |
| settings.sleep_time | 3600 | 2014/9/8/17:35 |
| settings.dns_address | 172.24.147.10 | 2014/9/7/10:00 |
| settings.ip_address | 172.24.147.3 | 2014/9/7/17:35 |
| settings.server_address | 172.24.147.51 | 2014/9/7/10:00 |
| ... | | |

As in Table B, in Table C-1 and Table C-2, information on each item of the key identifier, the value corresponding to the key identifier, and the date and time of final updating is included. Table C-1 corresponds to the MFP 121 and Table C-2 corresponds to the MFP 122. The key identifier here is also an identifier having the same system as that of the key identifier of the setting value meta information DB 410. As described above, the individual setting value DB 413 exists in correspondence to each device of the MFP and exists in the number of MFPs that are the targets of synchronization management by the server 110.

<Client Configuration Information Management DB>

Next, the client configuration information management DB 414 is explained. The client configuration information management DB 414 is a database that manages, for each device, client configuration information including information on the device identifier that identifies the device of the MFP, which is a client device, the model type name, the version of firmware, the already-installed license that indicates the function that can be made use of, etc. Table D shows a specific example of the client configuration information management DB 414.

TABLE D

| Attribute | Value |
|---|---|
| device identifier | device 1 |
| model type name | model type A |
| firmware version | 0.01 |
| already-installed license | copy-forgery-inhibited pattern license |
| accessory | Finisher-X |

The model type name, the version of firmware, the already-installed license, etc., have the same system as those stored in the setting value meta information DB 410.

<Registered Client Management DB>

Next, the registered client management DB 412 is explained. The registered client management DB 412 is a database for managing the device identifier of the target MFP whose setting values are under the synchronization management by the server 110.

<User information DB>

Next, the user information DB 415 is explained. The user information DB 415 is a database for managing information (a user ID for uniquely identifying a user, a user name that a user inputs at the time of login) on a user who makes use of a client device (MFP). Table E shows a specific example of the user information DB 415.

TABLE E

| User ID | User name | First name | Last name |
|---------|-----------|------------|-----------|
| 501 | sato | takashi | sato |
| 502 | ii | yoshiko | ii |
| ... | | | |

<User Setting Value DB>

Next, the user setting value DB 416 is explained. The user setting value DB 416 is a database for managing the setting values for each user that each user who makes use of the client (here, MFP) can make use of. In the user setting value DB 416, the user ID for uniquely identifying a user, the key identifier for uniquely identifying the setting value, the contents of the setting value, the date and time of final updating of the setting value are stored. Table F shows a specific example of the user setting value DB 416.

TABLE F

| User ID | Key identifier | Value | Date and time of final updating |
|---------|----------------|-------|---------------------------------|
| 501 | preference.print_setting1 | {colormode: "BW", copies: "3"} | 2014/2/4/2:01 |
| 501 | preference.print_setting2 | {colormode: "CL, quality: "low"} | 2014/2/3/7:35 |
| 501 | preference.address1 | {destination: "sato@canon.com"} | 2014/8/30/3:01 |
| 501 | preference.address2 | {destination: "user1@canon.com"} | 2014/1/13/2:16 |
| ... | | | |

The user ID in Table F has the same system as that in the user information DB 415 described previously.

It is possible for the server 110 to unitedly manage setting values different for different client devices (here, MFPs) to be managed, setting values common to all the MFPs to be managed, and meta data of each setting value itself by making use of each database within the master data 401 described above.

Subsequently, the setting value meta information DB that is managed by the MFP as a client device is explained. The setting value meta information DB is a database that stores meta data of various setting values that are used by the MFP and is saved in the HDD 305. Table G shows a specific example of the setting value meta information DB 410.

TABLE G

| Key identifier | Wording displayed on UI | Initial value | Value range | Adaptive model type/ firmware version | Display condition | Synchronization target |
|----------------|-------------------------|---------------|-------------|----------------------------------------|-------------------|------------------------|
| settings. pattern | copy-forgery-inhibited pattern printing | 0 | 0-1 | model type A/ALL model type B/ALL model type C/3.01 or later | copy-forgery-inhibited pattern license | only individually |
| settings. density | printing density | 5 | 0-10 | model type A/ALL model type B/2.01 or later | — | available in common |
| settings. density | printing density | 3 | 0-6 | model type B/1.99 or earlier model type C/ALL | — | available in common |
| settings. device_sirial | serial ID | "" | character string | ALL | — | only individually |
| settings. copy_cur_page | none (page number in copy) | 0 | 0-99999 | ALL | — | only individually |
| settings. sleep_time | sleep time | 0 | 0-14400 | ALL | — | available in common |
| settings. dns_address | DNS server address | "" | character string | ALL | — | available in common |
| ... | | | | | | |

In the example of Table G, information on each item of the key identifier for identifying each setting value at the time of performing communication with the server 110, the value of the setting value, the wording displayed on UI, the initial value, the value range, the display condition, and the synchronization target is included. These elements are managed by the same system as that which is managed by the master data 401. In the case where the setting value is changed in the server 110 or in the MFPs 121/122, for example, information, such as the key identifier, the value after the change, and the date and time of updating, is transmitted to the server 110 along with an updating request as setting value information, and processing to synchronize the setting value is performed in the server 110.

Figure 5:
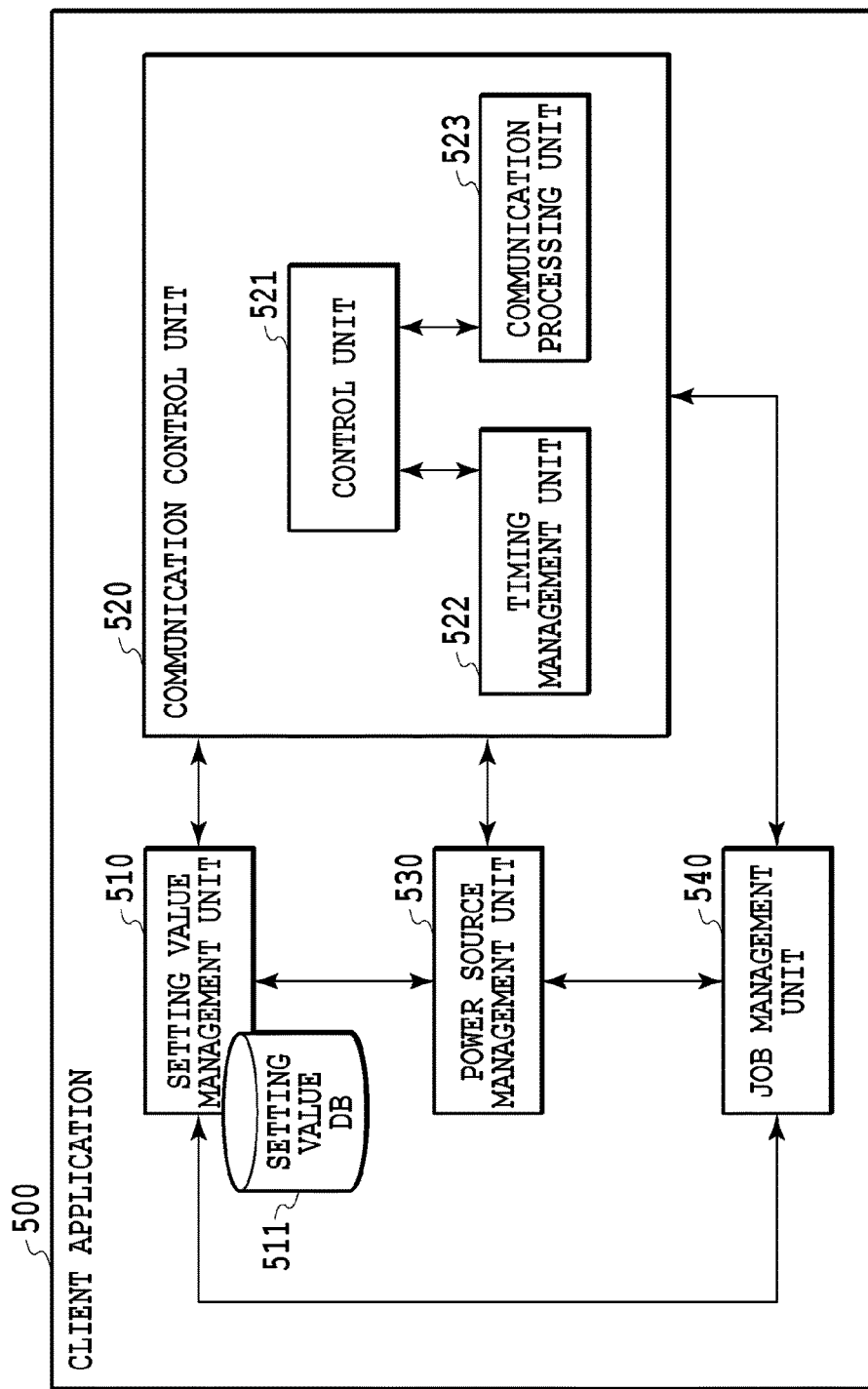
FIG. 5 is a function block diagram showing components of an application for implementing the function as a client.

FIG. 5 is a function block diagram showing components of an application (hereinafter, client application) running on the MFP, which is a client device, and for implementing the function as a client. A client application 500 is implemented by being stored in the HDD 305 or the ROM 306, developed onto the RAM 303, and executed by the CPU 302. The client application 500 includes a setting value management unit 510, a communication control unit 520, a power source management unit 530, and a job management unit 540. Hereinafter, each unit is explained.

The setting value management unit 510 manages a setting value DB 511 in the MFP as a client device. Specifically, in the case where information on updating of the setting value is received from the server 110, such as the case where the common setting value is changed in another MFP, the setting value management unit 510 performs processing to acquire the contents relating to the information on updating from the communication control unit 520 and to reflect the contents in the setting value DB 511 managed by itself. Further, the setting value management unit 510 commands the communication control unit 520 to make a request to the server 110 for reflection of the contents of the updating in the master data 401 managed by the server 110 in the case where the contents of the setting value within the setting value DB 511 are updated in the MFP.

The communication control unit 520 performs control of the communication processing to synchronize the setting value with the server 110. The communication control unit 520 includes a control unit 521 configured to perform control of the inside of the communication control unit 520, a timing management unit 522 configured to manage synchronization timing of the setting value, and a communication processing unit 523 configured to perform communication processing via the network I/F 307. The timing management unit 522 determines the timing of periodically acquiring information on updating of the master data 401 from the server 110. Further, the timing management unit 522 acquires a power source management state and a job execution state of the MFP from the power source management unit 530 and the job management unit 540, respectively, upon receipt of a command from the control unit 521. Then, the timing management unit 522 determines whether or not to notify the server 110 of the information on updating of the setting value DB 511 based on the acquired power source management state and job execution state. In the case where it is determined to notify the server 110 of the information on updating, instructions to perform communication processing with the server 110 are given to the communication processing unit 523 by the control unit 521. In the case where the communication processing unit 523 receives the information on updating of the setting value in the master data 401 from the server 110, the control unit 521 commands the setting value management unit 510 to reflect the value after the change, which is specified by the information on updating, in the setting value DB 511.

The power source management unit 530 manages the power source state of the MFP.

The job management unit 540 manages the execution state of the job that is input to the MFP.

Figure 6:
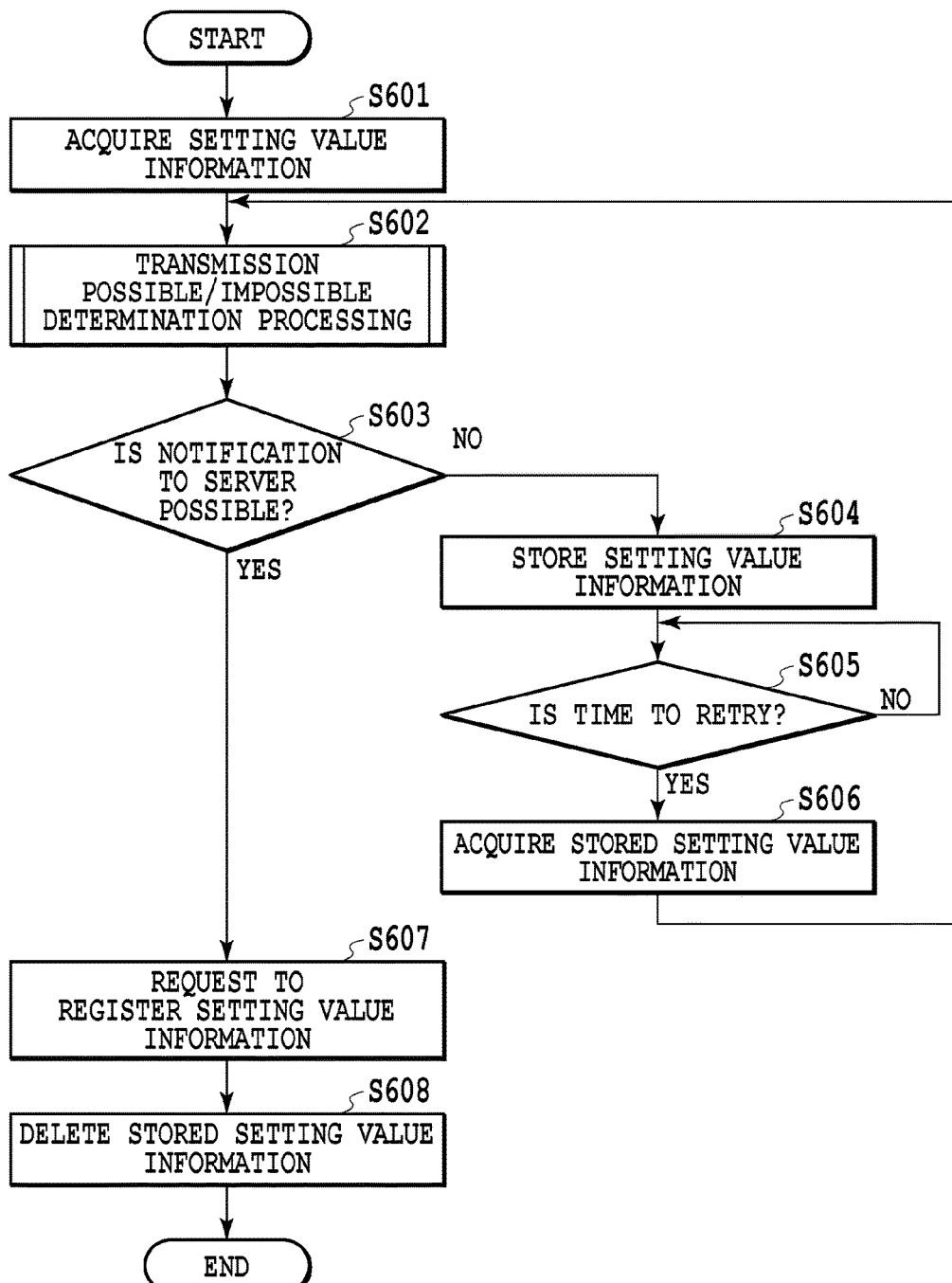
FIG. 6 is a flowchart showing a procedure of processing to register information on a setting value in a server in the case where the setting value is newly set in a client.

FIG. 6 is a flowchart showing a procedure of processing to register information on a setting value in the server (hereinafter, client setting value server registration processing) in the case where the setting value is set newly in the MFP as a client.

At step 601, the control unit 521 of the communication control unit 520 acquires information on the setting value, which the server 110 is commanded to register, from the setting value management unit 510 among the setting values stored in the setting value DB 511. In this case, in an environment where the initial connection processing has already been completed and the MFP is under the synchronization management by the server 110, and in a scene where, for example, a new setting value is registered additionally due to the version-up of the firmware or the like, the information on the setting value that is added is acquired. For example, in the case where the sleep time is registered additionally, at least the key identifier "settings.sleep_time" and the value "3600 (sec)" thereof are acquired as the setting value information. In contrast to this, in a scene where all the setting values are registered at the time of the initial connection processing, information on all the setting values (all the key identifiers and the values and character strings thereof) is acquired.

At step 602, the control unit 521 gives the timing management unit 522 instructions to determine whether or not it is possible to transmit the setting value information acquired at step 601 to the server 110 (to notify the server 110 of the setting value information acquired at step 601). Upon receipt of the instructions, the timing management unit 522 performs processing to determine whether or not it is possible to transmit the setting value information to the server 110 (transmission possible/impossible determination processing). Details of the transmission possible/impossible determination processing will be described later.

At step 603, the control unit 521 classifies the processing in accordance with the results of the transmission possible/impossible determination processing. Specifically, in the case where the determination results indicate that transmission (notification) is possible, the processing proceeds to step 607. On the other hand, in the case where the determination results indicate that transmission (notification) is not possible, the processing proceeds to step 604.

At step 604, the control unit 521 stores the setting value information acquired at step 601 in the HDD 305 or the like. Further, the control unit 521 gives the timing management unit 522 instructions to perform transmission (notification) in the case where the timing of transmitting registration information to the server 110 is reached.

At step 605, the timing management unit 522 determines whether or not a fixed time has elapsed from the point in time of the instructions from the control unit 521. Until the fixed time elapses (i.e., until the timing of transmitting registration information to the server 110 is reached), the determination is continued, and in the case where the fixed time has elapsed, this is transmitted to the control unit 521 (the control unit 521 is notified of this).

At step 606, the control unit 521 reads the setting value information stored in the HDD 305 or the like at step 604, and then, the processing returns to step 602 and the control unit 521 performs again the transmission possible/impossible determination processing.

At step 607, the control unit 521 gives the communication processing unit 523 instructions to make a request to the server 110 for registration of the setting value information acquired at step 601 (or read at step 606). Upon receipt of the instructions, the communication processing unit 523 transmits the registration request (=Create request) to the server 110 along with the setting value information.

At step 608, the control unit 521 deletes the setting value information stored in the HDD 305 and terminates the present flow.

The above is the contents of the client setting value server registration processing.

The processing in the case where the contents relating to the updating are reflected in the master data within the server 110 on a condition that the contents of the already-existing setting value are changed or updated in the client is basically the same as the processing at the time of registration described above. In other words, it is sufficient to change the term of the setting value information that is the target of acquisition (steps 601 and 606), storage (step 604), and deletion (step 608) in the flow in FIG. 6 described above into the term of the information on the updated setting value. Then, it is sufficient to change the wording of "transmits the registration request (=Create request) to the server 110 along with the setting value information" at step 607 into the wording of "transmits the updating request (=Update request) to the server 110 along with the setting value information". In the following, an example of updating of the setting value is explained using Table H and Table I. Table H shows the contents of the setting of the key identifier "settings.copy_cur_page". In the case where the value of the key identifier "settings.copy_cur_page" is changed from "66" to "67", the information on the contents shown in Table I is the target at each step, such as acquisition, storage, and deletion described above, and is transmitted to the server 110 as the setting value information along with the updating request.

TABLE H

| Key identifier | Value | Date and time of updating |
|---|---|---|
| settings.copy_cur_page | 66 | 2014/9/9/13:25 |

TABLE I

| Key identifier | Value | Date and time of updating |
|---|---|---|
| settings.copy_cur_page | 67 | 2014/9/9/13:25 |

The kinds of request relating to the setting value data managed in the server, which are transmitted from the client, include a setting value acquisition request (Get request) that requests for acquisition of the setting value registered in the DB on the server, and a setting value deletion request (Delete request) that requests for deletion of the setting value registered in the DB on the server, in addition to the setting value registration request and the setting value updating request described above. Further, the setting value acquisition request (Get request) includes an all setting values acquisition request (All Get request) that requests for acquisition of all the registered setting values and a setting value difference acquisition request (Difference Get request) that requests for acquisition of the setting value that has been changed after the time of the previous response.

Figure 7:
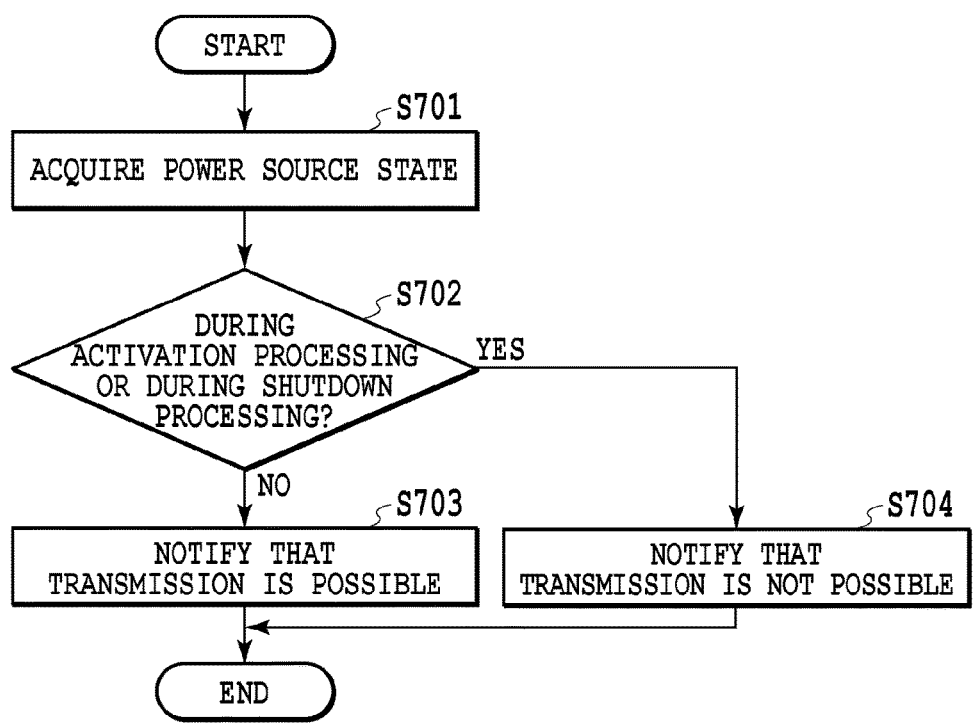
FIG. 7 is a flowchart showing details of transmission possible/impossible determination processing.

FIG. 7 is a flowchart showing details of the transmission possible/impossible determination processing at step 602 described previously.

Figure 8:
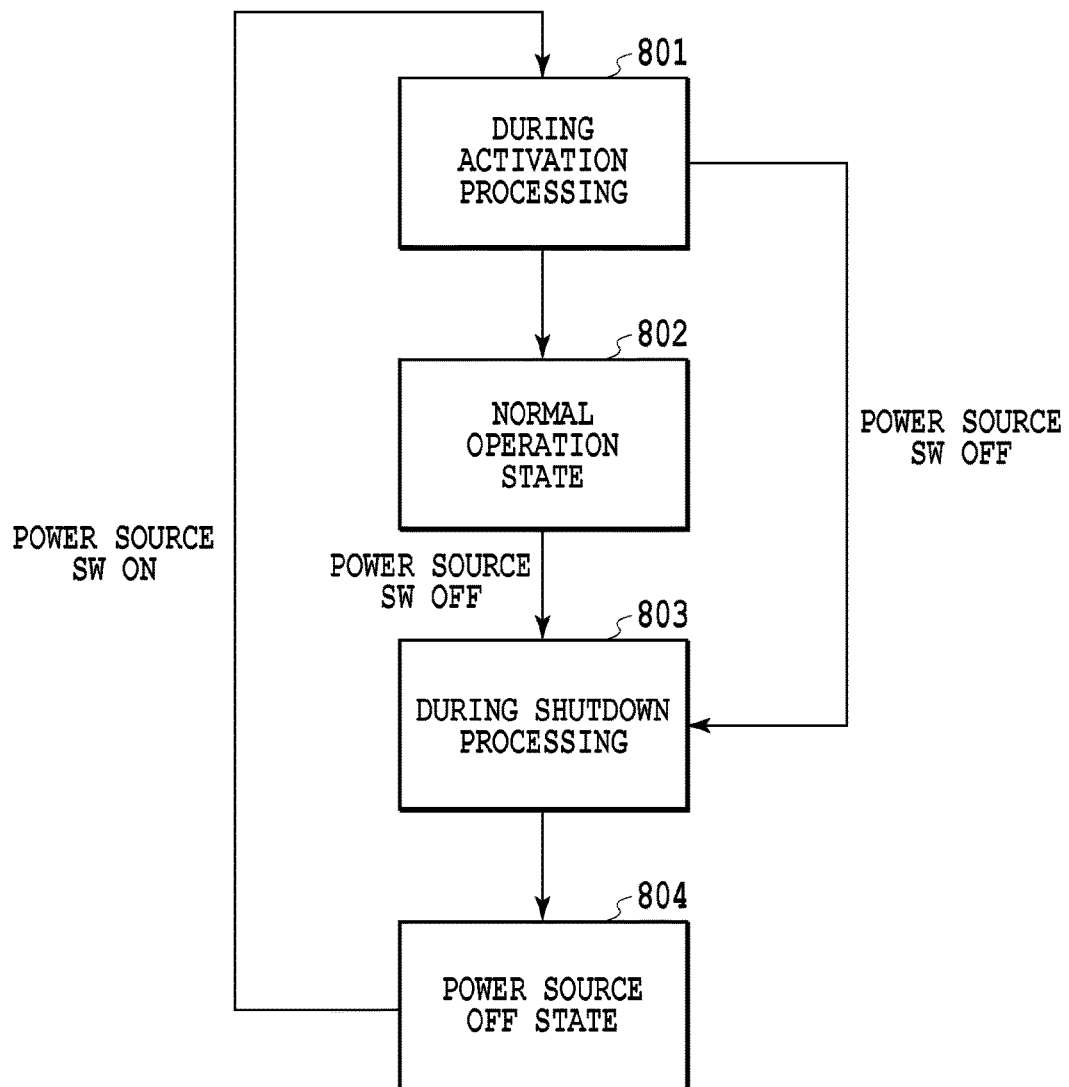
FIG. 8 is a diagram explaining a transition of a power source state of an MFP.

At step 701, the timing management unit 522 acquires information on the power source state of the MFP from the power source management unit 530. FIG. 8 is a diagram explaining the transition of the power source state of the MFP. First, in the case where the power source switch is turned on and the power source turns on from a power source off state 804, activation processing is started and the MFP makes a transition into a state during activation processing 801. In the case where the activation processing is completed, the MFP makes a transition into a normal operation state 802. In the case where the power source switch is turned off in the state during activation processing 801 or in the normal operation state 802, shutdown processing is started and the MFP makes a transition into a state during shutdown processing 803. Then, in the case where the shutdown processing is completed, the MFP makes a transition into the power source off state 804. In response to the inquiry about the power source state among the four kinds of state shown in FIG. 8 from the timing management unit 522, the power source management unit 530 notifies the timing management unit 522 of the information on the power source state at that point in time. As a matter of course, in the power source off state 804, neither the timing management unit 522 nor the power source management unit 530 operates, and therefore, the processing at this step is not performed.

At step 702, the timing management unit 522 determines whether or not the acquired power source state is the state during activation processing or the state during shutdown processing. In the case where the results of the determination indicate the state during activation processing or the state during shutdown processing, the processing proceeds to step 704. On the other hand, in the case where the power source state is neither the state during activation processing nor the state during shutdown processing (i.e., in the case of the normal operation state), the processing proceeds to step 703.

At step 703, the timing management unit 522 notifies the control unit 521 of the state where it is possible to transmit the setting value information acquired at step 601 to the server 110, and terminates the present flow.

At step 704, the timing management unit 522 notifies the control unit 521 of the state where it is not possible to transmit the setting value information acquired at step 601 to the server 110, and terminates the present flow.

The above is the contents of the transmission possible/impossible determination processing.

Next, the processing that is performed on the server 110 side in the case where there is a request for registration, updating, etc., of the setting value information from the MFP as a client is explained.

Figure 9:
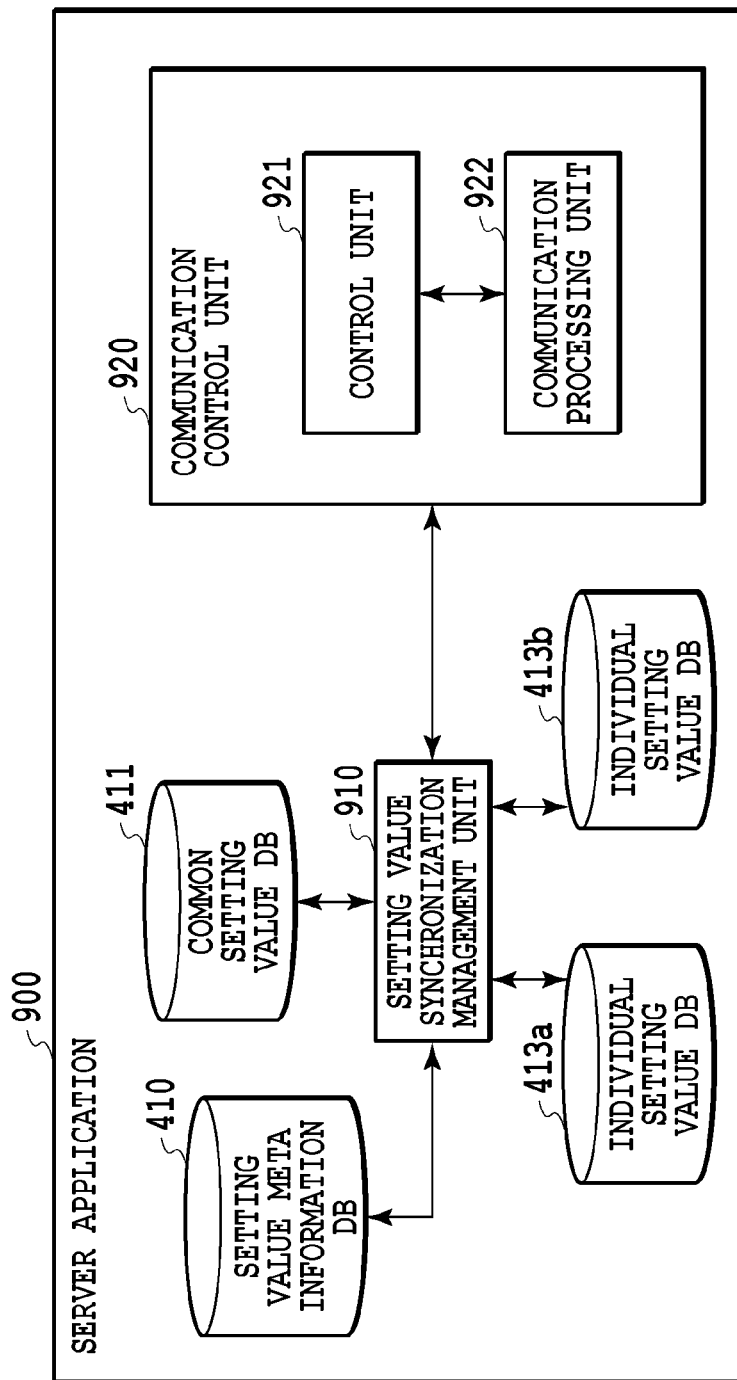
FIG. 9 is a function block diagram showing components of an application for implementing the function as a server that performs synchronization management of a client.

FIG. 9 is a function block diagram showing components of an application (hereinafter, a server application) running on the server 110 and for implementing the function as a server that performs synchronization management of a client. A server application 900 is implemented by being stored in the HDD 205 or the ROM 206, developed onto the RAM 204, and executed by the CPU 203. The server application 900 includes a setting value synchronization management unit 910 and a communication control unit 920. Hereinafter, each unit is explained.

The setting value synchronization management unit 910 performs synchronization management of the common setting value DB 411 and the individual setting value DB 413 among the master data 401 that the server 110 has. The individual setting value DB 413 exists in the number of clients (here, MFPs) that perform synchronization of the setting value with the server 110. In the configuration of the printing system illustrated in FIG. 1, the MFP 121 and the MFP 122 are the targets of synchronization management by the server 110, and therefore, an individual setting value DB 413*a* corresponding to the MFP 121 and an individual setting value DB 413*b* corresponding to the MFP 122 exist. The common setting value DB 411 and the individual setting value DBs 413*a* and 413*b* that are managed by the setting value synchronization management unit 910 are saved in the HDD 205 or the like. In the case where the communication control unit 920 receives a request for registration or updating from the MFPs 121/122 along with the setting value information, the setting value synchronization management unit 910 reflects the contents of the request in the common setting value DB 411 and the individual setting value DBs 413*a*/413*b* under management. Further, in the case where the communication control unit 920 receives a request for acquisition of the setting value difference information, to be described later, from the MFPs 121/122, the setting value synchronization management unit 910 creates setting value difference information to be transmitted to the MFPs 121/122.

The communication control unit 920 performs control of the communication processing to synchronize the setting value with the MFPs 121/122. The communication control unit 920 includes a control unit 921 configured to perform control of the inside of the communication control unit 920 and a communication processing unit 922 configured to perform communication processing. In the case where the communication processing unit 922 receives a request for registration or a request for updating from the MFPs 121/122 along with the setting value information, the control unit 921 gives the setting value synchronization management unit 910 instructions to register or update the setting value information. Further, in the case where the communication processing unit 922 receives a request for acquisition of the setting value difference information from the MFPs 121/122, the control unit 921 acquires the setting value difference information on the MFP related to the request for acquisition from the setting value synchronization management unit 910 and gives the communication processing unit 922 instructions to transmit the setting value difference information to the MFP that has made the request. Upon receipt of the instructions, the communication processing unit 922 performs processing to communicate with the MFP that has made the acquisition request.

Figure 10B:
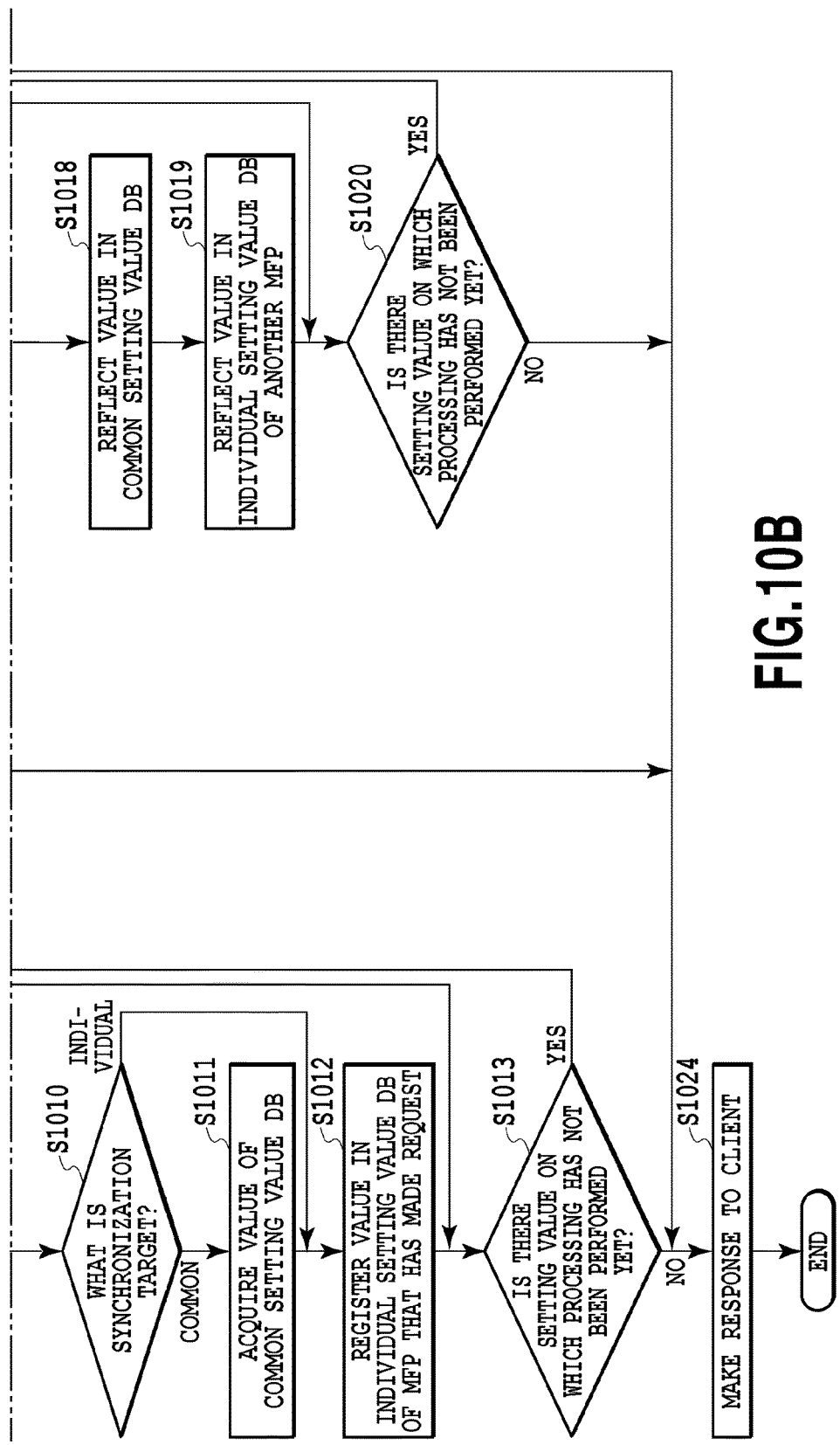
FIG. 10 is a diagram showing a relationship between FIGS. 10A to 10C, and FIGS. 10A, 10B and 10C are flowcharts showing an execution procedure of setting value synchronization processing in a server.
Figure 10C:
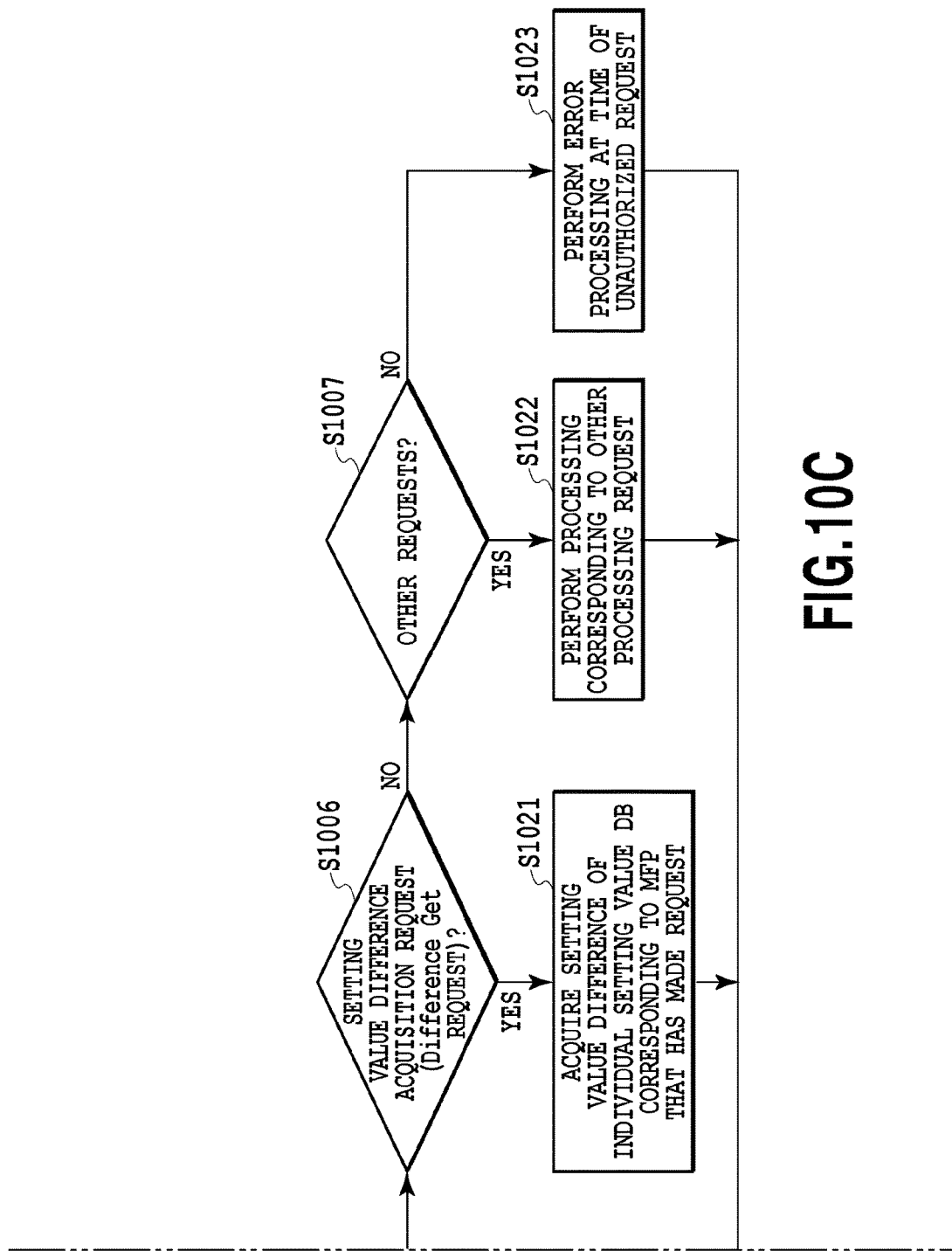

FIGS. 10A to 10C are flowcharts showing an execution procedure of the setting value synchronization processing (processing to synchronize various setting values with the MFP as a client) in the server.

At step 1001, the communication control unit 920 determines whether or not a request has been received from the MFP. In the case where no request has been received, the communication control unit 920 stands by until receiving a request. On the other hand, in the case where a request has been received, the processing proceeds to step 1002.

At step 1002, the communication control unit 920 analyzes the contents of the received request. At steps 1003 to 1007, the processing is classified based on the analysis results. In other words, whether the received request corresponds to the "setting value registration request (Create request)", the "all setting values acquisition request (All Get request)", the "setting value updating request (Update request)", the "setting value difference acquisition request (Difference Get request)", or the "other requests" is determined and the processing in accordance with the determination results is performed. In the case where the received request does not correspond to any kind of request, the communication control unit 920 determines that the received request is an unauthorized request and performs error processing (step 1023), and the processing proceeds to the processing to make a response to the client (step 1024).

At step 1003, the communication control unit 920 determines whether the received request is the setting value registration request. In the case where the request is the setting value registration request, the processing proceeds to step 1008. On the other hand, in the case where the request is not the setting value registration request, the processing proceeds to step 1004.

At step 1008, the communication control unit 920 determines a setting value on which attention is focused (setting value of interest) among the setting value information that is transmitted along with the request and gives the setting value synchronization management unit 910 instructions to register the setting value of interest in the individual setting value DB 413.

At step 1009, the setting value synchronization management unit 910 determines whether or not the information on the setting value of interest exists within the individual setting value DB 413 corresponding to the MFP that has made the registration request. In the case where the results of the determination indicate that the information on the setting value of interest already exists within the individual setting value DB 413 corresponding to the MFP that has made the registration request, the registration of the setting value of interest relating to the registration request is not performed, and therefore, the processing proceeds to step 1013. On the other hand, in the case where the information on the setting value of interest does not exist within the individual setting value DB 413 corresponding to the MFP that has made the registration request, the processing proceeds to step 1010.

At step 1010, the setting value synchronization management unit 910 determines whether the setting value of interest is the common setting value or the individual setting value by referring to the setting value meta information DB 410. Specifically, whether the synchronization target of the setting value of interest is "available in common" or "only individually" is determined. In the case where the results of the determination indicate "available in common", the processing proceeds to step 1011. On the other hand, in the case of "only individually", the processing proceeds to step 1012.

At step 1011, the setting value synchronization management unit 910 acquires the value of the setting value of interest from the common setting value DB 411.

At step 1012, the setting value synchronization management unit 910 registers the value of the setting value of interest within the individual setting value DB 413 along with the key identifier thereof in the case where the synchronization target is "only individually", or registers the value acquired at step 1011 along with the key identifier thereof in the case where the synchronization target is "available in common". Specifically, the setting value of interest is added to the record of the common setting value DB 411 or the individual setting value DB 413 described previously (a row is added to Table B or Table C).

At step 1013, the setting value synchronization management unit 910 determines whether or not there is a setting value on which the processing has not been performed yet among the setting value information transmitted along with the request. In the case where the registration processing has been completed for all the setting values, the processing proceeds to step 1024. On the other hand, in the case where there exists a setting value on which the processing has not been performed yet, the processing returns to step 1008, and the next setting value is determined to be the setting value of interest and the processing is continued.

The above is the processing in the case where the request is the setting value registration request.

On the other hand, in the case where the determination results at step 1003 are No, the setting value synchronization management unit 910 determines whether the received request is the all setting values acquisition request at step 1004. In the case where the request is the all setting values acquisition request, the processing proceeds to step 1014. On the other hand, in the case where the request is not the all setting values acquisition request, the processing proceeds to step 1005.

At step 1014, the setting value synchronization management unit 910 acquires the information on all the setting values from the individual setting value DB 413 of the MFP that has made the request and the processing proceeds to step 1024. The above is the processing in the case where the request is the all setting values acquisition request.

On the other hand, in the case where the determination results at step 1004 are No, the setting value synchronization management unit 910 determines whether the received request is the setting value updating request at step 1005. In the case where the request is the setting value updating request, the processing proceeds to step 1015. On the other hand, in the case where the request is not the setting value updating request, the processing proceeds to step 1006.

At step 1015, the communication control unit 920 determines a setting value on which attention is focused (setting value of interest) among the setting value information transmitted along with the request, and gives the setting value synchronization management unit 910 instructions to update the setting value of interest in the individual setting value DB 413.

At step 1016, the setting value synchronization management unit 910 reflects the value of the setting value of interest in the individual setting value DB 413 and updates the setting value. Specifically, the setting value synchronization management unit 910 updates the value of the record of the setting value of interest that already exists within the common setting value DB 411 or the individual setting value DB 413 described previously (updates the value in the row in Table B or Table C).

At step 1017, the setting value synchronization management unit 910 determines whether the setting value of interest is the common setting value or the individual setting value by referring to the setting value meta information DB 410. Specifically, the setting value synchronization management unit 910 determines whether the synchronization target of the setting value of interest is "available in common" or "only individually". In the case where the results of the determination indicate "available in common", the processing proceeds to step 1018. On the other hand, in the case of "only individually", the processing proceeds to step 1020.

At step 1018, the setting value synchronization management unit 910 reflects the value of the setting value of interest in the common setting value DB 411 and updates the setting value. Further, the processing proceeds to step 1019 and the setting value synchronization management unit 910 also reflects the value of the setting value of interest in the individual setting value DB 413 of the other MFPs (MFPs that have not made the updating request) and updates the setting value.

At step 1020, the setting value synchronization management unit 910 determines whether or not there is a setting value on which the processing has not been performed yet among the setting value information transmitted along with the request. In the case where the updating processing has been completed for all the setting values, the processing proceeds to step 1024. On the other hand, in the case where there exists a setting value on which the processing has not been performed yet, the processing returns to step 1015, and the next setting value is determined to be the setting value of interest and the processing is continued.

The above is the processing in the case where the request is the setting value updating request.

On the other hand, in the case where the determination results at step 1005 are No, the setting value synchronization management unit 910 determines whether the received request is the setting value difference acquisition request. In the case where the request is the setting value difference acquisition request, the processing proceeds to step 1021. On the other hand, in the case where the request is not the setting value difference acquisition request, the processing proceeds to step 1007.

At step 1021, the setting value synchronization management unit 910 acquires the value of the setting value (setting value difference) that has been changed after the time of the previous response from the individual setting value DB 413 of the MFP that has made the request, and the processing proceeds to step 1024. The above is the processing in the case where the request is the setting value difference acquisition request.

On the other hand, in the case where the determination results at step 1006 are No, the setting value synchronization management unit 910 determines whether the received request is one of the other processing requests (e.g., Delete request). In the case where the request is one of the other processing requests, the processing proceeds to step 1022 and the processing corresponding to the one of the other processing requests is performed, and the processing proceeds to step 1024. On the other hand, in the case where the request does not correspond to anyone of the other processing requests, the request is determined to be an unauthorized request and error processing is performed (step 1023), and then, the processing proceeds to step 1024.

At step 1024, the communication control unit 920 makes a predetermined response in accordance with the request to the client (here, MFP) under management.

The above is the contents of the setting value synchronization processing in the server 110. By the processing such as this, it is made possible to register or reflect the client setting value updated in the MFPs 121/122 in the database within the server 110, or for the MFPs 121/122 to acquire the setting value from the server 110.

For example, in the case where the MFP as a client makes the setting value registration request (see step 607 in the flow in FIG. 6 described previously), the server having received the request performs the processing at step 1008 and subsequent steps described above. In the case where the MFP as a client makes the setting value updating request, the server having received the request performs the processing at step 1015 and subsequent steps described above. Further, in the case where the MFP as a client makes the all setting values acquisition request or the setting value difference acquisition request, in the client having received the setting value information responded at step 1024 described above, the contents of the setting value information are reflected in the setting value DB 511 by the setting value management unit 510.

Here, in the scene where the client performs the initial connection processing, first, the setting value registration request is transmitted from the client to the server and then, the all setting values acquisition request is transmitted from the client to the server. The problem of the present application that occurs at the time of the initial connection processing will be explained later in detail.

It is assumed that a user has changed the IP address (client IP address), which is the client setting value, from, for example, "address A" to "address B" in the client device that is equipped with the server function and which also plays the role of a server (hereinafter, referred to as a "two-role-holding device"). In this case, the server and the client are physically the same device, and therefore, the IP address, which is the server setting value, is also changed to "address B". As a result of this, in each client synchronized with the two-role-holding device (all the clients under the synchronization management of the two-role-holding device, including the two-role-holding device itself as a client), in the case where, for example, an attempt to transmit the setting value updating request is made to the two-role-holding device, the updating request does not reach the two-role-holding device because the address of the connection destination server is still "address A", and therefore, it is no longer possible to synchronize with the two-role-holding device. In the case where the connection to the two-role-holding device has failed as described above, a user using each client tries to connect to the two-role-holding device again after changing the value of the connection destination server address to the address after the change (address B) (after setting again the value of the connection destination server address). In this stage, the connection is the initial connection to the connection destination server address (address B) that is set again, and therefore, the initial connection processing is necessary. As described above, in the initial connection processing, first, the all setting values registration request is made to the two-role-holding server. In the all setting values information that is transmitted along with the registration request at this time, the information on the connection destination server address is included and the contents in this stage are "address B" after the setting is performed again. In the two-role-holding device having received the all setting values registration request, it is determined that all the setting values that are requested have already been registered (Yes by the determination at step 1009 for all the setting values of interest), and therefore, the registration processing based on the all setting values registration request is not performed. In other words, a response to the effect that the processing for the all setting values registration request has been completed normally is made (step 1024) without the contents of the individual setting value DB 413 corresponding to the client that has performed the initial connection processing being changed. As a result of this, the initial connection processing is completed normally with the value of the connection destination server address within the individual setting value DB 413 corresponding to the client that has performed the initial connection processing being still "address A". Subsequently, the client transmits the all setting values acquisition request to the two-role-holding device in the initial connection processing and the two-role-holding device having received the acquisition request acquires the information on all the setting values within the individual setting value DB 413 of the client that has made the all setting values acquisition request and makes a response (step 1024). At this time, the contents of the connection destination server address that exist in the responded setting value information are "address A".

As described above, such a problem will occur that even in the case where a user changes the connection destination server address on the client following the change in the IP address in the two-role-holding device, the registration request is not received by the two-role-holding device, and therefore, the state before the change returns again.

In the following, a method of resolving the above-described problem according to the present embodiment is explained in detail.

Figure 11:
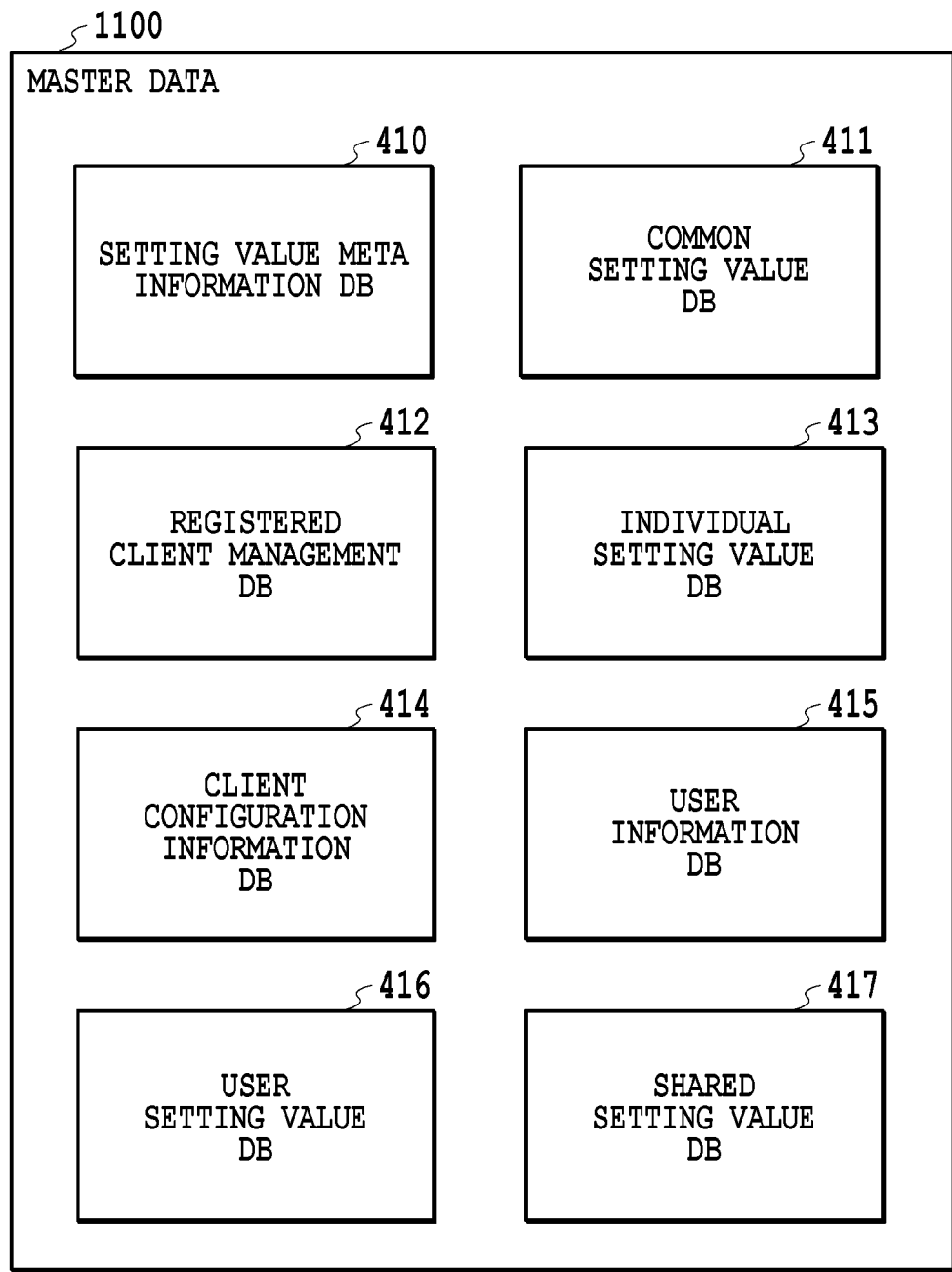
FIG. 11 is a block diagram showing a configuration example of master data that is managed by an information processing apparatus that functions as both a server and a client.

FIG. 11 is a block diagram showing a configuration example of master data that is managed by an information processing apparatus (here, MFP) that plays two roles as both a server and a client in the method of the present embodiment, corresponding to FIG. 4 described previously. Master data 1100 shown in FIG. 11 has a shared setting value DB 417, in addition to the configuration shown in FIG. 4 (the setting value meta information DB 410, the common setting value DB 411, the registered client management DB 412, the individual setting value DB 413, the client configuration information DB 414, the user information DB 415, and the user setting value DB 416). Table J is an example of the setting value information that is stored within the shared setting value DB and shows an IP address here. In other words, the IP address is the IP address as the client setting value and at the same time, the IP address as the server setting value.

TABLE J

| Key identifier | Value |
|---|---|
| settings.ip_address | 172.24.147.51 |
| . . . | |

In the present embodiment, the configuration is such that the information on the shared setting value is saved and managed as a database as described above, but the configuration is not limited to this. For example, the information only needs to be saved and managed in an aspect in which the information can be referred to, such as file data.

Figure 12:
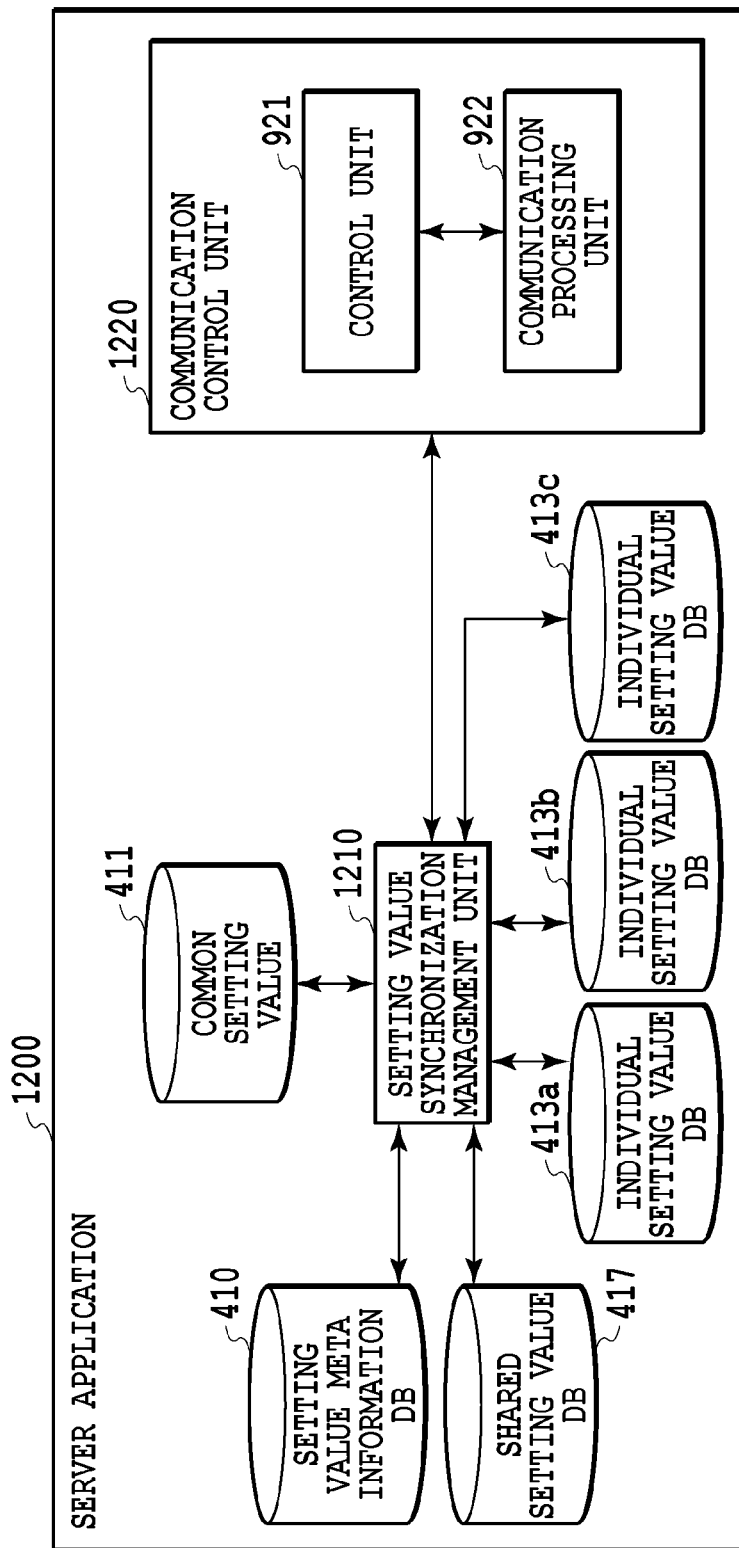
FIG. 12 is a function block diagram showing components of a server application.

FIG. 12 is a function block diagram showing components of a server application running on the information processing apparatus having both the function as a server and the function as a client, and for implementing the function as a server that performs synchronization management of a client according to the present embodiment, corresponding to FIG. 9 described previously. Like the server application 900 described previously, a server application 1200 is implemented by being stored in the HDD 205 or the ROM 206, developed onto the RAM 204, and executed by the CPU 203. The server application 1200 shown in FIG. 12 includes a setting value synchronization management unit 1210 and a communication control unit 1220, and the basic configuration thereof is the same as that of the server application 900 described previously. The server application 1200 differs from the server application 900 shown in FIG. 9 in that the above-described shared setting value DB 417 is added as a database that is managed by the setting value synchronization management unit 1210.

In the configuration in which a specific client on a network has also the server function, the client and the server exist on the same device. In other words, the client application 500 shown in FIG. 5 and the server application 1200 shown in FIG. 12 are installed on the one device.

Because of this, it is possible for the setting value management unit 510 on the client application 500 and the setting value synchronization management unit 1210 on the server application 1200 to directly transmit and receive data.

In the present embodiment, as a method for resolving the above-described problem, in the case where the setting value stored within the shared setting value DB 417 is changed in the client device that also functions as a server (two-role-holding device), the setting value relating to the changed setting value in terms of performing synchronization management is changed at the same time. For example, in the case where the value of the IP address (key identifier "settings.ip_address") shown in Table J described previously is changed, the value of the connection destination server address (key identifier "settings.server_address") that is stored within the individual setting value DB 413 is changed to the same value as that of the IP address after the change.

Figure 13:
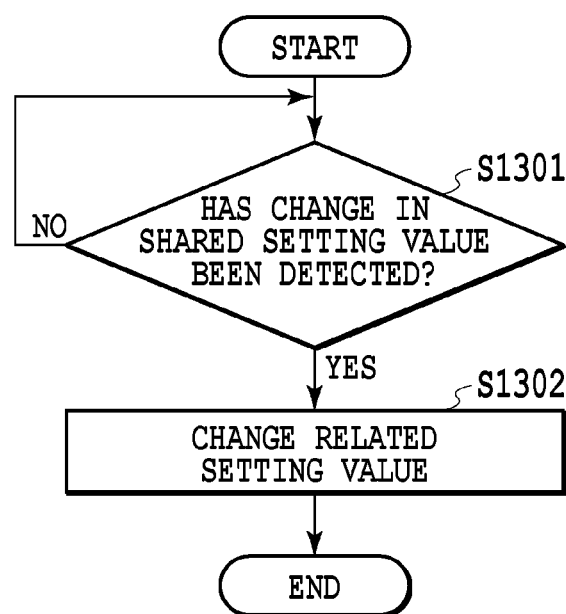
FIG. 13 is a flowchart of processing to change a related setting value in each client under the management of a server in the case where a shared setting value is changed in a device that functions as both a server and a client.

FIG. 13 is a flowchart of processing to also change the related setting value in each client under the management of the server in the case where the shared setting value is changed in the two-role-holding device. This processing is performed by the above-described server application 1200 and is performed as processing different from and independent of the setting value synchronization processing shown in the flow in FIGS. 10A to 10C described previously.

Step 1301 is a step of monitoring the presence/absence of a change in the shared setting value. That the setting value stored within the shared setting value DB 417 has been changed is detected, for example, as follows.

First, the setting value synchronization management unit 1210 commands the setting value management unit 510 in advance to give notification to the setting value synchronization management unit 1210 in the case where the value of the same key identifier as the key identifier stored within the shared setting value DB 417 has been changed at the time of activation of the two-role-holding device. Due to this, in the case where the key identifier within the setting value DB 511 under the management of the setting value management unit 510 is changed, the setting value management unit 510 of the client application 500 notifies the setting value synchronization management unit 1210 of the server application 1200 of the occurrence of the change in the value of the identifier relating to the command along with the value after the change (e.g., the IP address value after the change). Such a system is referred to as a callback system. In the case where the change in the shared setting value is detected by the method such as this, the processing proceeds to step 1302.

At step 1302, the setting value synchronization management unit 1210 changes the setting value, which is stored within each database (the common setting value DB 411, the individual setting value DB 413, and the shared setting value DB 417) under the management of the setting value synchronization management unit 1210, and which relates to the above-described shared setting value in terms of synchronization management, to the value after the change that has been received at step 1301. Due to this, for example, in the case where the IP address of the device itself is changed, it is possible to change the value of the connection destination server address within the individual setting value DB 413 of all the clients to the value of the IP address after the change.

The above is the contents of the processing to also change the setting value of each client relating to synchronization management in the case where the shared setting value is changed in the client device that also has the server function.

In the above-described example, the aspect is explained, in which the presence/absence of the change in the shared setting value is detected by the so-called callback system and upon receipt of the notification, the setting value relating to the changed setting value is changed, but the present embodiment is not limited to the method such as this. In the following, an aspect is explained, in which the presence/absence of the change in the shared setting value is detected by a method different from the above-described method and the related setting value is changed appropriately.

First, the setting value synchronization management unit 1210 commands the setting value management unit 510 to deliver the value of a specific key identifier (e.g., key identifier "settings.ip_address" of the IP address) within the shared setting value DB 417 at specific timing (e.g., at the time of activation of the server, periodic polling, etc.). The setting value management unit 510 having received the command returns the value of the key identifier within the setting value DB 511 under the management of the setting value management unit 510 to the setting value synchronization management unit 1210. The setting value synchronization management unit 1210 having received the value of the key identifier compares the value within the shared setting value DB 417 with the received value for the key identifier, and in the case where both are different, the setting value synchronization management unit 1210 changes the value of the related key identifier (in this case, "settings.server_address") to the received value. Then, the setting value synchronization management unit 1210 also changes the value of the key identifier (here, "settings.ip_address") within the shared setting value DB 417 to the received value. By the method such as this, it is also possible to detect the change in the shared setting value and to appropriately change the setting value of each client relating to synchronization management.

By the processing such as this, it is possible to simultaneously change the values of the connection destination server addresses of all the clients that are the targets of synchronization management, for example, in the case whether the value of the IP address of the device itself is changed in the two-role-holding device, which is the client also having the server function. As a result of this, the value of the connection destination server address after being set again is not returned to the value of the connection destination server address before being set again in the initial connection processing that is performed in the case where a user sets again the value of the connection destination server address on the client side. In other words, such a problem does not occur that it is no longer possible for each client, which is the target of synchronization management, to connect to the server in the case where the IP address is changed in the two-role-holding device.

As the example in which the shared setting value is changed, the case where the value of the IP address is changed is explained, but in the case where, for example, the "host name" is changed, as in the case where the IP address is changed, the connection destination server address is changed as the related setting value. The reason is that, like the IP address, the host name is also for identifying and specifying the two-role-holding device on the network and for playing the same role.

By the processing described above, in the case where the setting value of each client on the database under the management of the two-role-holding device is changed following the change in the shared setting value in the two-role-holding device, the contents thereof are reflected in the setting value DB 511 within each client as follows. Hereinafter, brief explanation is given.

First, the communication control unit 520 of the client application 500 in each client device transmits the setting value difference information acquisition request to the two-role-holding device at predetermined timing that is managed by the timing management unit 522. At this time, as information necessary for specifying the setting value difference relating to the acquisition request in the two-role-holding device, information on the time at which the previous setting value difference information acquisition request was made is included in the this time setting value difference information acquisition request. Then, upon receipt of the setting value difference information transmitted from the two-role-holding device as a response to the acquisition request, the communication control unit 520 reflects the contents of updating based on the setting value difference information received via the setting value management unit 510 in the setting value within the setting value DB 511.

In this manner, the contents of the individual setting value DB 413 updated following the change in the value within the shared setting value DB 417 in the two-role-holding device are reflected in the setting value that is used by each client.

[Second Embodiment]

Next, as a method of resolving the problem of the present application, an aspect is explained as a second embodiment, in which the shared setting value, such as the IP address and the host name, is changed on a UI screen that is displayed on the operation unit. In the present embodiment, it is also assumed that the shared setting value is changed in the information processing apparatus having both the function as a server and the function as a client. Explanation of the portions in common to those of the first embodiment is omitted or simplified and in the following, different points are explained mainly.

Figure 14:
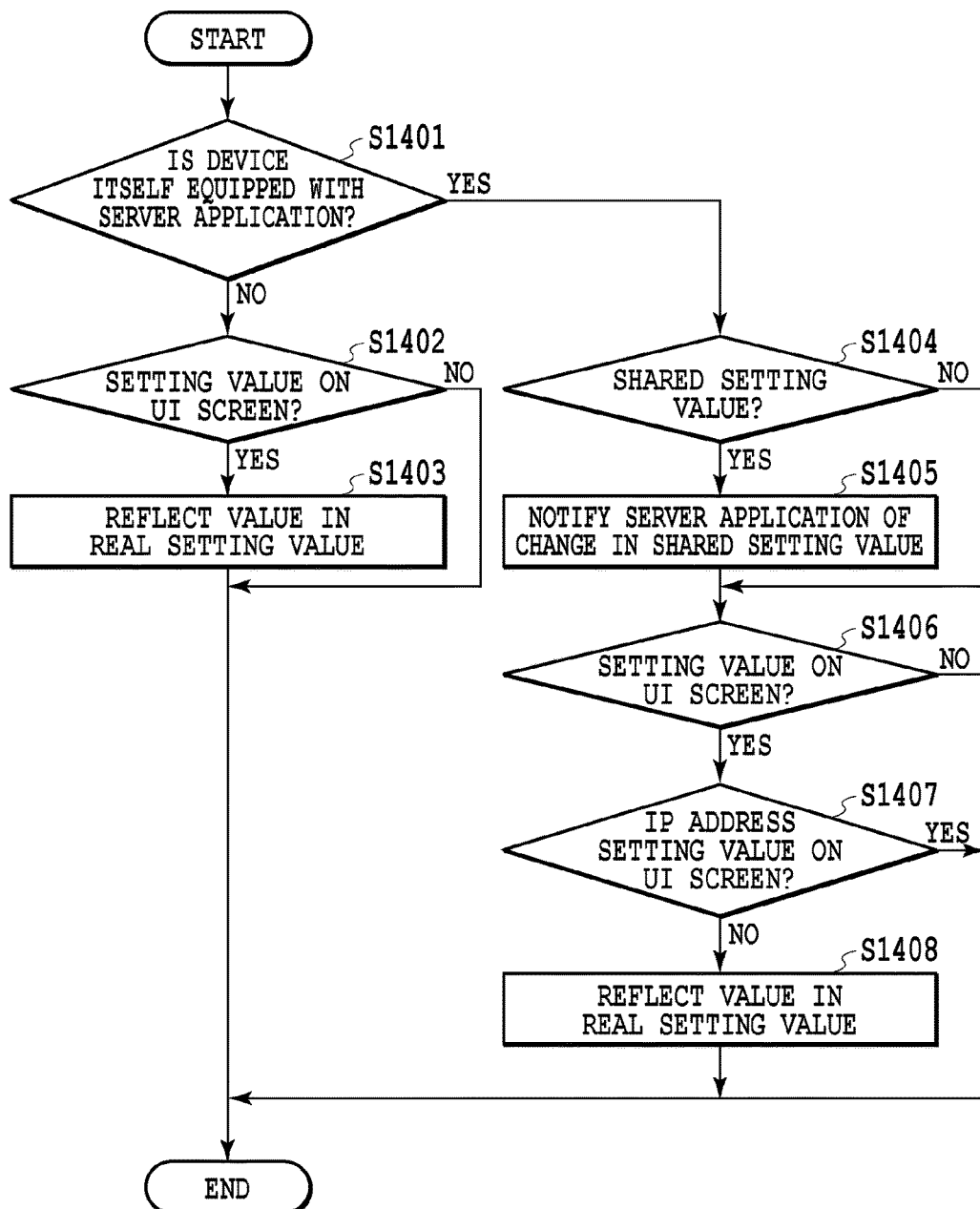
FIG. 14 is a flowchart showing a flow of processing in a client application according to a second embodiment.
Figure 15:
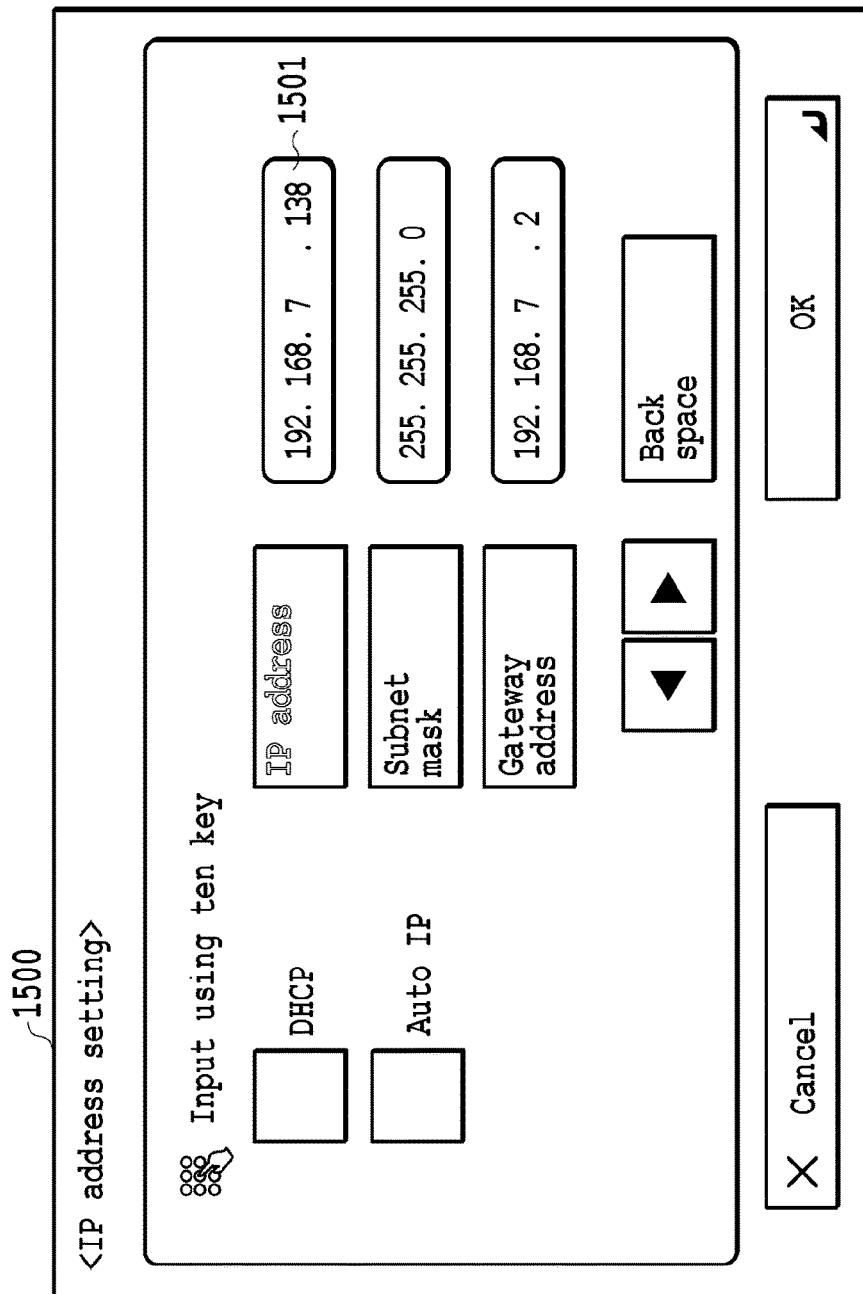
FIG. 15 is a diagram showing an example of a user interface screen that is used in the case where a user changes an IP address.

FIG. 14 is a flowchart showing a flow of processing in the client application in the case where the setting value (client setting value) is changed on the MFP as a client according to the present embodiment. FIG. 15 is a diagram showing an example of a user interface screen (UI screen) that is used in the case where a user changes the IP address. Hereinafter, explanation is given with reference to FIG. 14 and FIG. 15.

In the case where the setting value is changed by, for example, a new value being input to an IP address input box 1501 within a UI screen 1500 shown in FIG. 15, the setting value management unit 510 determines whether or not the device itself is equipped with the server function (or server application for implementing the server function) at step 1401. This determination is performed by, for example, such methods as in 1) to 3) below.

1) The value of the "connection destination server address" and the value of the "IP address" of the device itself are checked and in the case where both values are the same, it is determined that the device itself is equipped with the server function.

2) In the case where the value of the "connection destination server address" is the value of the so-called loopback address (virtual IP address indicating itself on the network), it is determined that the device itself is equipped with the server function.

3) In the case where a file that is generated at the time of activation of the server application exists in the device itself, it is determined that the device itself is equipped with the server function.

In the case where it is determined that the device itself is not equipped with the server function by the methods described above (the case where the device itself is not the two-role-holding device), the processing proceeds to step 1402. On the other hand, in the case where it is determined that the device itself is equipped with the server function (the case where the device itself is the two-role-holding device), the processing proceeds to step 1404.

At step 1402, the setting value management unit 510 determines whether or not the changed setting value is the setting value on the UI screen (UI screen as shown in FIG. 15) displayed on the operation unit of the device itself. In the case where the changed setting value is the setting value on the UI screen, the processing proceeds to step 1403. On the other hand, in the case where the changed setting value is not the setting value on the UI screen, the present processing is terminated.

At step 1403, the setting value management unit 510 reflects the setting value that has been changed on the UI screen in the real setting value. For example, in the case where a user has changed the value in the IP address input box on the above-described UI screen 500 from "172.24.147.51" to "172.24.9.110", the setting value management unit 510 updates the real IP address (IP address registered within the setting value DB 511) that is used actually by the device to "172.24.9.110", which is the value after the change.

On the other hand, at step 1404 in the case where it is determined that the device itself is equipped with the server function, the setting value management unit 510 determines whether or not the changed setting value is the "shared setting value" described previously. As information at the time of the determination of whether or not the changed setting value is the shared setting value, for example, it may also be possible to register the information on the shared setting value in the device itself by the server application 1200 at the time of activation of the device, or to hold the information on the shared setting value in advance in the HDD 305 or the like within the device itself. In the case where the changed setting value is the shared setting value, the processing proceeds to step 1405. On the other hand, in the case where the changed setting value is not the shared setting value, the processing proceeds to step 1406.

At step 1405, the setting value management unit 510 notifies the setting value synchronization management unit 1210 of the server application 1200 in operation within the device itself of the change in the shared setting value.

At step 1406, the setting value management unit 510 determines whether or not the changed setting value is the setting value on the UI screen displayed on the operation unit of the device itself as at step 1403 described above. In the case where the changed setting value is the setting value on the UI screen, the processing proceeds to step 1407. In the case where the changed setting value is not the setting value on the UI screen, the present processing is terminated.

At step 1407, the setting value management unit 510 determines whether or not the changed setting value is the IP address value (here, the value in the IP address input box 1501 on the UI screen 1500) on the UI screen displayed on the operation unit of the device itself. In the case where the changed setting value is the IP address value on the UI screen, the present processing is terminated without changing the real setting value. As described above, by not changing the real setting value in the stage where the IP address has been changed on the UI screen of the two-role-holding device, it is made possible for another client (MFP) in synchronization with the two-role-holding device to synchronize with the two-role-holding device also after a user has changed the IP address on the UI screen of the two-role-holding device. On the other hand, in the case where the changed device setting value is not the IP address value on the UI screen, the processing proceeds to step 1408. Here, the IP address is involved, but the host name playing the same role may also be involved.

At step 1408, the setting value management unit 510 reflects the setting value that has been changed on the UI displayed on the operation unit of the device itself in the real setting value. In other words, as at step 1403 described above, the setting value registered within the setting value DB 511 is changed to the value after the change.

The above is the contents of the processing in the client application in the case where the setting value is changed on the client (MFP) according to the present embodiment. In the present embodiment, in the case where the setting value that has been changed in the MFP other than the two-role-holding device is not the setting value on the UI screen, the setting value after the change is immediately reflected in the real setting value, but it may also be possible to reflect the setting value after the change in the real setting value at the time of a "Setting reflection button (not shown)" being pressed down separately by a user, or at timing at which the device is activated again.

Figure 16:
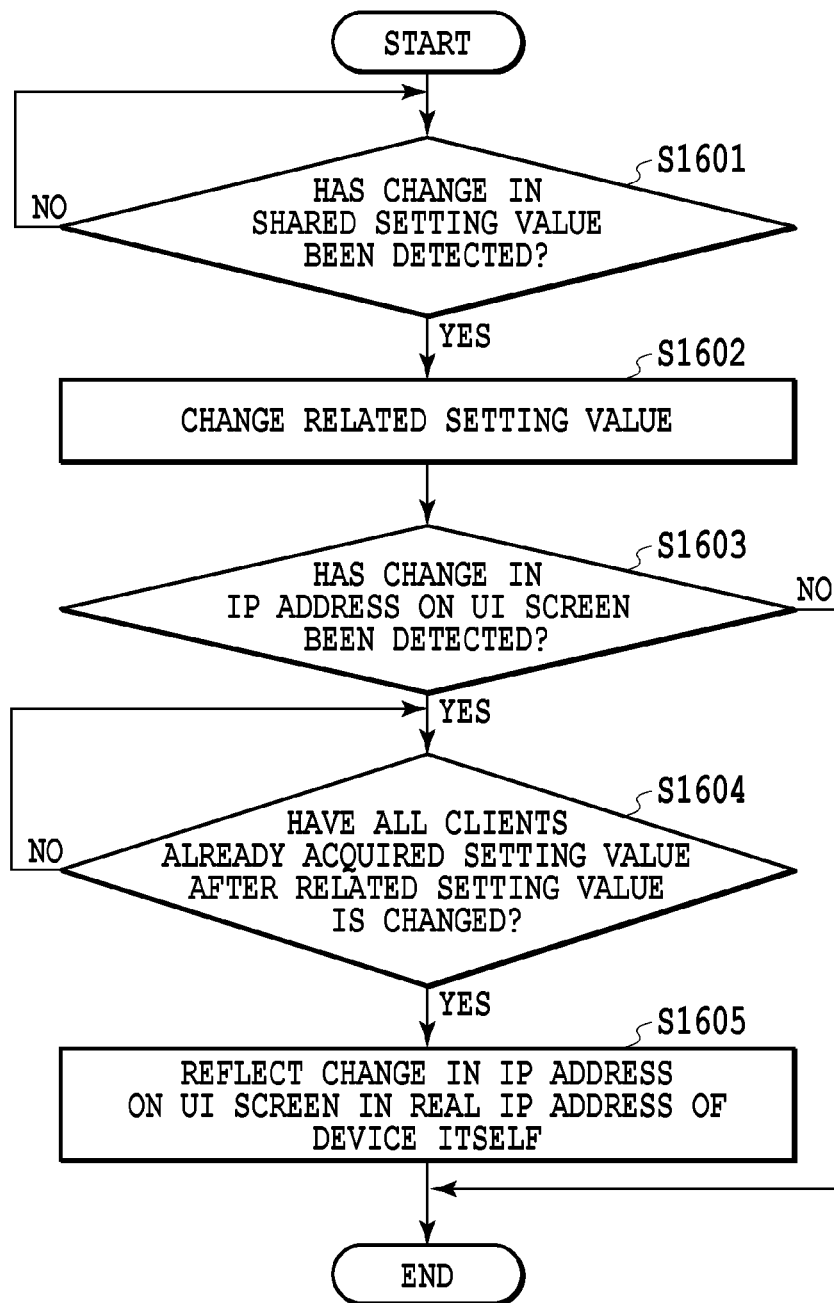
FIG. 16 is a flowchart showing a flow of processing in a server application in the case where the change in an IP address is detected in a device that functions as both a server and a client according to the second embodiment.

Subsequently, the processing in the server application 1200 that runs on the two-role-holding device in the case where the change in the IP address is detected in the two-role-holding device in the flow in the client application shown in FIG. 14 is explained with reference to the flowchart in FIG. 16. The processing flow in the server application 1200 is performed independently of the flow in FIGS. 10A to 10C.

At step 1601, the setting value synchronization management unit 1210 determines whether or not notification of the change in the shared setting value has been received. The notification is the notification of the change at step 1405 in the flow in FIG. 14 described previously. The setting value synchronization management unit 1210 stands by until receiving the notification of the change. In the case where the notification to effect that the shared setting value has been changed is received, the processing proceeds to step 1602.

At step 1602, the setting value synchronization management unit 1210 changes the setting value relating to the above-described changed shared setting value (related setting value) that is stored within each database under the management of the setting value synchronization management unit 1210. The processing at this step is the same as that at step 1302 in the flow in FIG. 13 described previously. In the present embodiment, in the case where the value of the IP address on the UI screen in the device itself is changed, the values of the connection destination server addresses on the individual setting value DBs 413 of all the clients are changed to the value of the new IP address on the UI screen.

At step 1603, the setting value synchronization management unit 1210 determines whether or not the changed shared setting value is the value of the IP address on the UI screen displayed on the operation unit of the device itself. In the case where the changed shared setting value is not the value of the IP address on the UI screen, the present flow is terminated. In the case where the changed shared setting value is the value of the IP address on the UI screen displayed on the operation unit of the device itself, the processing proceeds to step 1604.

At step 1604, the communication control unit 1220 determines whether or not the setting value acquisition request has been made from all the clients in synchronization after the change in the related setting value. Specifically, in the case where one of the "all setting values acquisition request" and the "setting value difference acquisition request" described previously has been made, it is determined that the setting value acquisition request has been made. Then, in the case where the setting value acquisition request has been made, the value of the "connection destination server address on the individual setting value DB 413 of each client", which has been changed at step 1602, is acquired and a response is made to each client. Then, each client having received the response acquires the value of the connection destination server address after the change and changes the value of the setting value DB 511 of the client itself, and after that, makes a request at the time of the synchronization processing to the connection destination server address after the change. At this point in time, the real IP address is not changed yet in the two-role-holding device, and therefore, each client does not find the server that is specified by the connection destination server address after the change, resulting in a connection error, and each client continues to retry a request.

At step 1605, the setting value synchronization management unit 1210 commands the setting value management unit 510 of the client application 500 to change the value of the real IP address registered within the setting value DB 511 of the device itself to the value of the IP address on the UI screen displayed on the operation unit of the device itself. By the setting value management unit 510 having received the command, the value of the real IP address within the setting value DB 511 is changed. Then, at the timing at which the real IP address of the two-role-holding device is changed to the new IP address at this step, the connection error of each client is eliminated as a result.

The above is the contents of the processing in the server application 1200 that runs on the two-role-holding device in the case where the change in the IP address is detected in the two-role-holding device.

As above, according to the present embodiment, at the time at which a user changes the IP address of the device itself via the UI screen in the two-role-holding device, the connection destination server address of all the clients is also changed to the IP address after the change. Then, the information on the connection destination server address after the change is reflected in all the clients, and therefore, the synchronization between the server and the client is maintained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, even in the case where the setting value that is shared with and referred to by the server is changed in the client device equipped with the server function, it is possible to implement synchronization between the server and each client with no problem.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-066040, filed Mar. 27, 2015, which is hereby incorporated by reference wherein in its entirety.

What is claimed is:

1. An information processing apparatus including an embedded client, the information processing apparatus comprising:
    a memory storing instructions related to a server for managing, by a database, setting information of each of a plurality of clients including the embedded client and a network client; and
    a processor executing the instructions causing the information processing apparatus to:
    perform, if an input for changing a value of address information as a network setting of the information processing apparatus is performed on the information processing apparatus, update processing for updating a connection destination address managed by the database for each client with the value corresponding to the changing, wherein the changing is not reflected as the network setting of the information processing apparatus until the value used for the update processing is transmitted to all of the plurality of clients; and
    transmit the value of the connection destination address managed by the database for each clients to each client in response to a request from each client,
    wherein, in the network client, setting information which is used by the network client to access the server is updated with the transmitted value, and
    wherein the changing is reflected as the network setting of the information processing apparatus after the value used for the update processing has been transmitted to all of the plurality of client.

2. The information processing apparatus according to claim 1, wherein the instructions further causes the information processing apparatus to command the embedded client to reflect the changing, and
    wherein the changing is reflected as the network setting of the information processing apparatus by the embedded client.

3. The information processing apparatus according to claim 1, wherein the information processing apparatus further comprises an interface for receiving the input from a user.

4. A control method for an information processing apparatus including an embedded client and server for managing, by a database, setting information of each of a plurality of clients including the embedded client and a network client, the control method comprising:
    performing, if an input for changing a value of address information as a network setting of the information processing apparatus is performed on the information processing apparatus, update processing for updating a connection destination address managed by the database for each client with the value corresponding to the changing, wherein the changing is not reflected as the network setting of the information processing apparatus until the value used for the update processing is transmitted to all of the plurality of clients; and
    transmitting the value of the connection destination address managed by the database for each client to each client in response to a request from each client,
    wherein, in the network client, setting information which is used by the network client to access the server is updated with the transmitted value, and
    wherein the changing is reflected as the network setting of the information processing apparatus after the value used for the update processing has been transmitted to all of the plurality of clients.

5. A non-transitory computer readable storage medium storing a server program for causing a computer to perform a control method for information processing apparatus including an embedded client and a server related to the server program, the control method comprising:
    managing, by a database, setting information of each of a plurality of clients including the embedded client and a network client;
    performing, if an input for changing a value of address information as a network setting of the information processing apparatus is performed on the information processing apparatus, update processing for updating a connection destination address managed by the database for each client with the value corresponding to the changing, wherein the changing is not reflected as the network setting of the information processing apparatus until the value used for the update processing is transmitted to all of the plurality of clients; and
    transmitting the value of the connection destination address managed by the database for each client to each client in response to a request from each client,
    wherein, in the network client, setting information which is used by the network client to access the server is updated with the transmitted value, and
    wherein the changing is reflected as the network setting of the information processing apparatus after the value used for the update processing has been transmitted to all of the plurality of clients.

* * * * *